(12) United States Patent
Sie et al.

(10) Patent No.: US 7,779,439 B2
(45) Date of Patent: Aug. 17, 2010

(54) PROGRAM GUIDE ENVIRONMENT

(75) Inventors: John J. Sie, Englewood, CO (US); John C. Beyler, Highlands Ranch, CO (US)

(73) Assignee: Starz Entertainment, LLC, Englewood, CO (US)

( * ) Notice: Subject to any disclaimer, the term of this patent is extended or adjusted under 35 U.S.C. 154(b) by 2191 days.

(21) Appl. No.: 10/128,653

(22) Filed: Apr. 22, 2002

(65) Prior Publication Data

US 2002/0178446 A1 Nov. 28, 2002

Related U.S. Application Data

(60) Provisional application No. 60/285,817, filed on Apr. 23, 2001, provisional application No. 60/368,646, filed on Mar. 29, 2002.

(30) Foreign Application Priority Data

Feb. 28, 2002 (CN) ................. 02 1 06593

(51) Int. Cl.
*H04N 5/445* (2006.01)
*H04N 7/10* (2006.01)
*H04N 7/025* (2006.01)

(52) U.S. Cl. .............. 725/34; 725/32; 725/35; 725/46

(58) Field of Classification Search .......... 725/32–36
See application file for complete search history.

(56) References Cited

U.S. PATENT DOCUMENTS

| 5,610,653 | A | 3/1997 | Abecassis |
| 5,619,249 | A | 4/1997 | Billock et al. |
| 5,684,918 | A | 11/1997 | Abecassis |
| 5,805,154 | A | 9/1998 | Brown |
| 5,850,218 | A | 12/1998 | LaJoie et al. |
| 5,945,988 | A | 8/1999 | Williams et al. |
| 5,977,964 | A | 11/1999 | Williams et al. |
| 5,995,134 | A | 11/1999 | Hayashi |
| 6,005,561 | A | 12/1999 | Hawkins et al. |
| 6,049,333 | A | 4/2000 | LaJoie et al. |

(Continued)

FOREIGN PATENT DOCUMENTS

WO    WO 00/79798 A1    12/2000

OTHER PUBLICATIONS

Broadband Week.com website printout entitled, "Join over 23,000 key decision-makers in the broadband market every business day . . . " Broadband Week, at http://www.broadbandweek.com/news/020603/print/020603_content_one.htm, Jun. 3, 2002; 3 pages.

(Continued)

*Primary Examiner*—Joseph P Hirl
*Assistant Examiner*—Fred Peng
(74) *Attorney, Agent, or Firm*—Townsend and Townsend and Crew LLP

(57) ABSTRACT

According to the invention, a method for suggesting alternative content for a video service in a content distribution system is disclosed. In one step, it is detected when a user stops viewing a program associated with a content provider. Alternative programs associated with the content provider are determined without considering content from other providers. Those alternative programs are presented to the user.

18 Claims, 35 Drawing Sheets

U.S. PATENT DOCUMENTS

| | | |
|---|---|---|
| 6,163,272 A | 12/2000 | Goode et al. |
| 6,163,316 A | 12/2000 | Killian |
| 6,166,730 A | 12/2000 | Goode et al. |
| 6,177,931 B1 | 1/2001 | Alexander et al. |
| 6,314,572 B1 | 11/2001 | LaRocca et al. |
| 6,314,573 B1 | 11/2001 | Gordon et al. |
| 6,314,575 B1 | 11/2001 | Billock et al. |
| 6,324,338 B1 | 11/2001 | Wood et al. |
| 6,486,892 B1 | 11/2002 | Stern |
| 6,571,390 B1 | 5/2003 | Dunn et al. |
| 6,637,029 B1 | 10/2003 | Maissel et al. |
| 6,698,020 B1 * | 2/2004 | Zigmond et al. ............ 725/34 |
| 6,725,303 B1 | 4/2004 | Hoguta et al. |
| 6,813,775 B1 | 11/2004 | Finseth et al. |
| 7,017,173 B1 * | 3/2006 | Armstrong et al. ............ 725/87 |
| 2002/0026459 A1 | 2/2002 | Fernandez |
| 2002/0077880 A1 | 6/2002 | Gordon et al. |
| 2002/0120498 A1 | 8/2002 | Gordon et al. |
| 2002/0178440 A1 * | 11/2002 | Agnihotri et al. ............ 725/10 |
| 2003/0020744 A1 | 1/2003 | Ellis et al. |
| 2003/0061610 A1 | 3/2003 | Errico |
| 2003/0067554 A1 | 4/2003 | Klarfeld et al. |
| 2003/0088872 A1 | 5/2003 | Maissel et al. |
| 2003/0101451 A1 | 5/2003 | Bentolila et al. |
| 2004/0117831 A1 | 6/2004 | Ellis et al. |
| 2005/0097599 A1 * | 5/2005 | Plotnick et al. ............ 725/32 |

OTHER PUBLICATIONS

Leibowitz, Dennis H., "Interactive TV: Turning Couch Potatoes Into Mouse Potatoes," Cable TV and New Media: Law & Finance, Media Law Publishing Corp., vol. XVIII, No. 1, 6 pages (Apr. 2000).

* cited by examiner

PROGRAM GUIDE ENVIRONMENT

This application is a non-provisional of U.S. Provisional Application No. 60/285,817 filed on Apr. 23, 2001 and U.S. Provisional Patent Application No. 60/368,646 filed on Mar. 29, 2002, which are both incorporated herein by reference. Further, this application claims foreign priority to Chinese Application No. 02106593.4 filed on Feb. 28, 2002. This application is filed on the same day as the following related applications with U.S. patent application Ser. No. 10/128,654 filed on Apr. 22, 2002 and U.S. patent application Ser. No. 10/128,653 filed on Apr. 22, 2002, both of which are incorporated herein by reference.

BACKGROUND OF THE INVENTION

This invention relates in general to program guides and, more specifically, to conditional access systems that provide access to content supplied by content providers.

Content is delivered by satellite, microwave, UHF, VDSL, optical fiber, VHF, or cable to conditional access set top boxes of users in a number of different ways. Most content is available according to a linear schedule published in programming guides. Certain additional services are available with some of these delivery systems, for example, pay per view (PPV), video on demand (VOD) and near video on demand (NVOD). PPV allows a user to purchase the right to view a program according to a linear schedule. VOD provides the ability to view a program at any time with control of the playback by the user. NVOD is a hybrid approach where a program is available on a number of channels in a linear program with staggered start times, but the user cannot control playback.

PPV, VOD and NVOD store the content remote from the user for delivery on a dedicated or shared channel. PPV and NVOD are broadcast according to a linear schedule and multiple users share that single channel to view the program simultaneously. Because the single channel is shared, no user can control the playback of the content. In contrast, conventional VOD is singlecasted on a dedicated channel available to a single user, which allows control of the playback. The VOD content resides on a server at the headend and is streamed over the dedicated channel under the control of the user. For example, a user can start, stop, rewind, fast forward, or pause a VOD program.

Personal video recorders (PVR) or digital video recorders (DVR) store video content on a hard drive instead of removable tapes that are used by video cassette recorders (VCR). The DVR functionality may be in a separate unit in the user location or could be integrated into the set top box. Recently, capacities of around 60 hours of video content have been achieved. This capacity allows storage of many programs on the DVR. Program guides typically list these stored programs in alphabetical order or by category in alphabetical order. Linearly-scheduled programs are often displayed in a program grid.

BRIEF DESCRIPTION OF THE DRAWINGS

The present invention is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

In one embodiment, the present invention provides a method for suggesting alternative content for a video service in a content distribution system. In one step, it is detected when a user stops viewing a program associated with a content provider. Alternative programs associated with the content provider are determined without considering content from other providers. Those alternative programs are presented to the user.

In another embodiment, the present invention provides a method for suggesting alternative content for a video service in a content distribution system. In one step, it is detected when a user stops viewing a program associated with a content provider. A plurality program categories associated with the content provider are determined. The plurality program categories are presented to the user.

In yet another embodiment, the present invention provides a method for suggesting alternative content for a video service in a content distribution system. In one step, it is detected when a user stops viewing a program associated with a content provider. Alternative programs associated with the content provider are determined according to preferences for the user. Those alternative programs are presented to the user.

Figure 1:
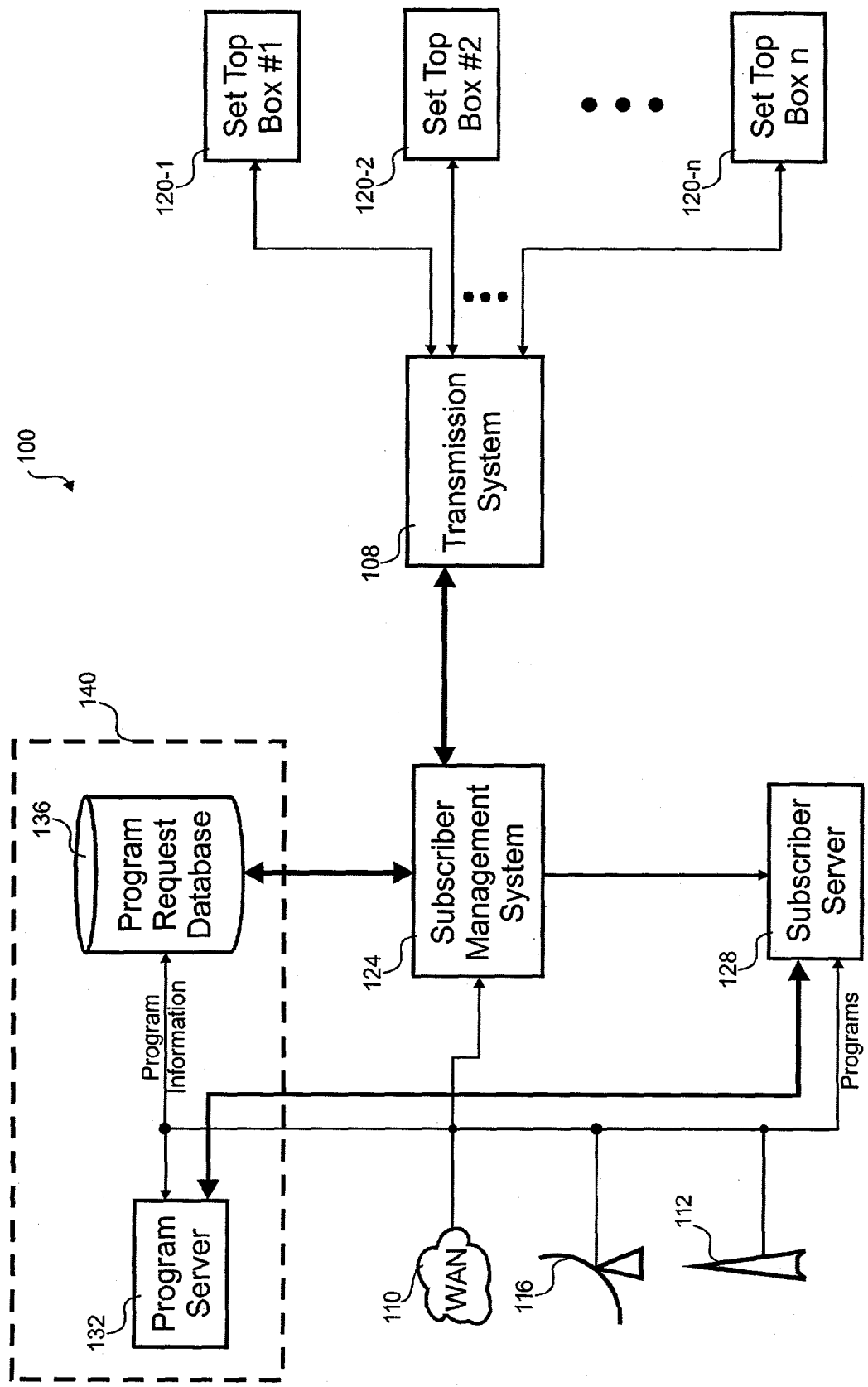
FIG. 1 is a block diagram that shows an embodiment of a program delivery system.

Referring first to FIG. 1, a block diagram of one embodiment of a program delivery system 100 is shown. The program delivery system 100 includes a transmission system 108, set top boxes 120, a subscriber management system 124, a subscriber server 128, a program server 132, a program request database 136, and a satellite dish 116. The program server 132 and the program request database 136 are part of a system of an additional content provider 140. The additional content provider system 140 interfaces with the other components that are part of a system of a cable television provider or MSO. Some embodiments could include a number of additional content providers 140.

The subscriber management system 124 contains account information for all users such as customer names, addresses, set top box addresses, credit history, billing information, subscription status, SVOD club status, and VOD status. This information is used to provide conditional access to programs for the set top box(es) 120 of each user. Interactive screens or guides for selecting services are formulated by the subscriber management system 124. The screens allow the user to select additional products or services. From the satellite dish 116, WAN 110, broadcast TV antenna 112, and/or additional content provider 140, the subscriber management system 124 receives program information relating to any downloaded programs or real-time programs that are made available by the program delivery system 100.

The subscriber server 128 stores content that is provided to the transmission system 108 for distribution to the set top boxes 120. Programs are stored in compressed digital form. Preferably, MPEG-2 compression is used, although, other embodiments could use different algorithms such as MPEG-4. The programs are downloaded from the satellite dish 116, additional content provider 140 and/or WAN 110 for later broadcast or are provided from content providers on removable storage media such as tapes, disks, etc. Additionally, real-time content is provided to the subscriber server 128 for immediate broadcast from sources such as the satellite dish 116, broadcast television antennas 112 or wide area networks 110.

The cable television provider interacts with the systems of additional content providers 140 in order to supply additional programs to users. This additional content could include commercial supported channels, commercial-free channels, home shopping, interactive services, pay-per-view (PPV) services, VOD services, subscription video on demand (SVOD), or NVOD services.

SVOD is a hybrid between VOD and the linear schedule of programs where a content provider offers some or all of their linearly scheduled programs as VOD programs to members of a club that may or may not require additional consideration to join. A notification symbol informs users that a linearly scheduled program is available with full or partial control of playback to club members. The SVOD selections may change periodically as the linear schedule commonly does. In some embodiments, any user may be able to become a club member by interacting with the set top box 120 or by calling into customer service. In some embodiments, all or part of each of the SVOD programs is stored local to the user location in anticipation of the user later requesting the SVOD program. In other embodiments, the SVOD programs are stored in the transmission system or at the headend.

In this embodiment, a program request database 136 and program server 132 respectively provide additional information to the cable television provider for billing, for example, and content to the cable television provider for broadcast to specific set top boxes 120. A standard interface or custom software allows interaction between the systems of the additional content provider 140 and the cable television provider. Interaction between the cable television provider and additional content providers 140 allows communicating program, billing and other information. Some embodiments may perform all the billing functions with the cable television provider while only periodically interacting with the additional content providers 140.

The subscriber management system 124 interacts with the program request database 136 in order to provide program entitlement to users. In this embodiment, the program request database 136 stores user specific information, club specific information and programming information. The user specific information includes such things as name, address, set top box address, membership privileges, membership history, and available credit. The club specific information includes such things as program listings and descriptions; promotional information for the programs; coming attractions, premieres and specials; a membership history summary; and program usage by class of program. For real-time broadcasts, the programming information includes such things as program schedules, program descriptions, promotional clips of the programs, and upcoming specials.

The user specific information, club specific information and programming information are available to the subscriber management system 124 for accounting purposes and for formulating the guide menu screens presented to the user. For example, the user may want to know their account balance or the number of times certain classes of programs were viewed.

Some embodiments can limit the amount of times a user can replay a program during a defined period or number of uses in a period. This usage information is stored in the program request database 136 and used by the subscriber management system 124 before entitling a set top box 120 to watch a program. Some embodiments could enforce usage requirements in other locations by referencing the information in the subscriber management system 124 in various ways.

The program server 132 stores programs associated with an additional content provider 140. The subscriber management system 124 checks with the program request database 136 to determine if a program is available. The program server 132 can load the programs onto the subscriber server 128 or directly couple the program to the transmission system 108. Accordingly, the subscriber management system 124 uses the information from program request database 136 in order to entitle the program for the users. This embodiment shows the program server 132 directly coupled to the subscriber server 128, but other embodiments could communicate with a wireless link, a satellite link, a network link, packet-switched link, a circuit switched link, etc.

The transmission system 108 takes the various programs and multiplexes them onto a conduit coupled to the set top boxes 120. Typically, frequency division multiplexing techniques are used in order to transmit the various program streams onto a single coaxial cable. Optical fiber may also be used as part of a hybrid fiber-coax (HFC) network. The transmission system 108 may include analog to digital converters, digital compression hardware, multiplexers and other items in order to make the best use of the available bandwidth. The subscriber management system 124 controls the transmission system 108 to route the appropriate program streams to the desired set top box 120 of the user. Although not shown in the figure, a node can be interposed between the transmission system 108 and the set top box 120 as is well known in the art. Some embodiments could use a VDSL delivery mechanism, fiber to the curb, satellite broadcast, wireless networking, packet switched delivery, etc. in the transmission system.

Although the program request database 136 is separate from the subscriber management system 124 in this embodiment, some embodiments could combine these functions. Program information could be provided to the subscriber management system 124 for management from there with appropriate software and hardware. Billing functions could also be managed in the combined function.

Figure 2:
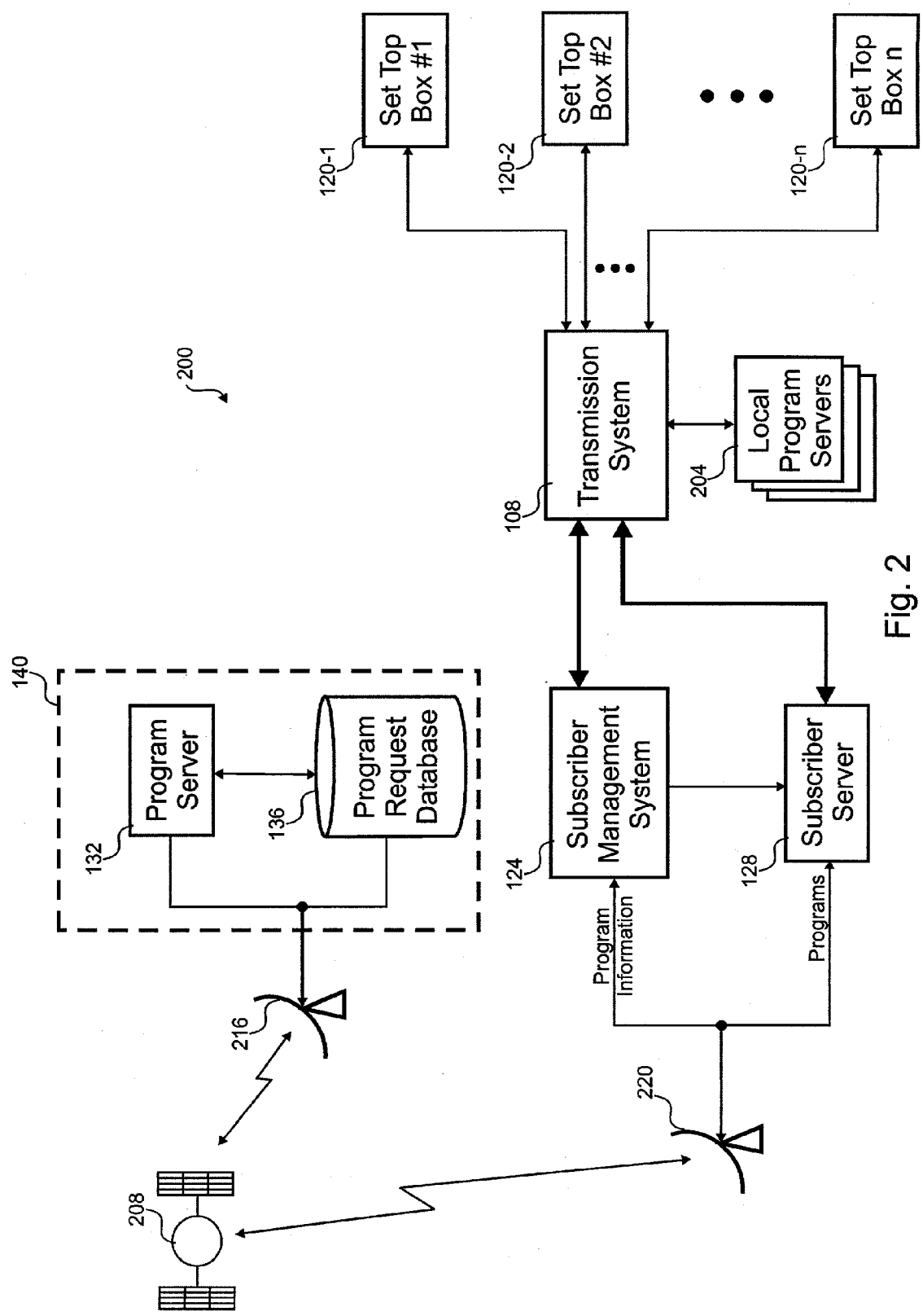
FIG. 2 is a block diagram illustrating another embodiment of a program delivery system that remotely locates an additional content provider away from a cable provider.

With reference to FIG. 2, another embodiment is shown which separates the additional content provider system 140 from the cable television provider system. Also included in this embodiment, are local program servers 204 coupled to the transmission system 108. This embodiment allows the additional content provider 140 to have a central location that could communicate with a number of cable television providers or MSOs in remote geographical locations. A first and second satellite dishes 216, 220 communicate with each other through a satellite 208. The satellite 208 provides bi-directional communication such that the subscriber management system 124 can interact with the program request database 136 and the program server 132 can send the program to the subscriber server 128 or send the program to the set top boxes 120 using the transmission system 108. Some embodiments could use unidirectional satellite communication and use another communication link for the other direction, for example, the Internet could be used for one direction.

This embodiment provides local program servers 204 at various points in the transmission system 108. These local program servers 204 could be coupled to the nodes in the transmission system 108 or otherwise distributed throughout. Each set top box 120 has access to one or more local program servers 204 that can source programs to the users. The user typically has the ability to manipulate the playback of these programs. The programs come from the program server 132 and/or the subscriber server 128. By moving programs closer to the user, a dedicated channel is only required between the local program server 204 and the set top box 120 to provide playback manipulation while the program is singlecasted through that dedicated channel.

Figure 3:
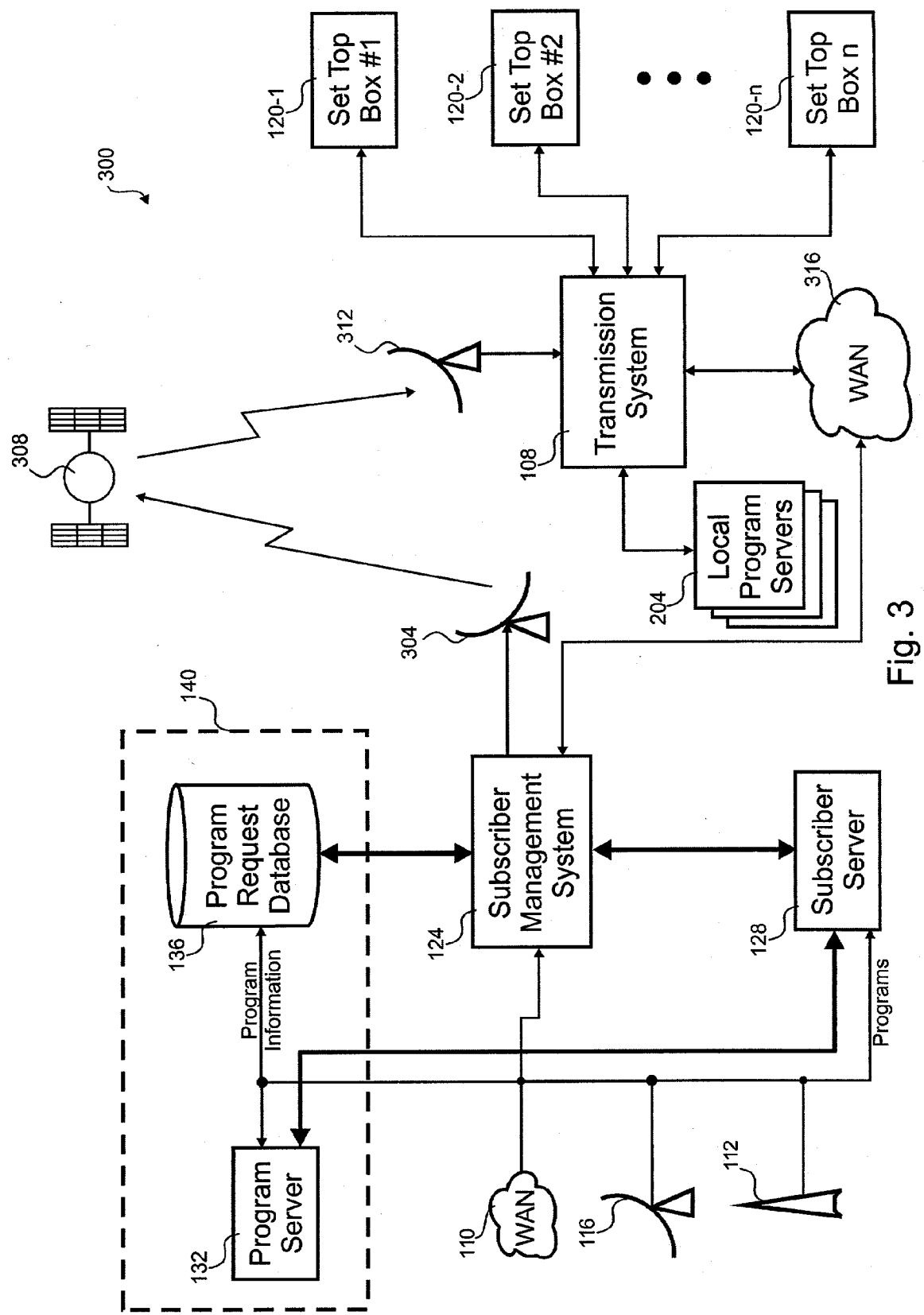
FIG. 3 is a block diagram depicting one embodiment of a program delivery system that wirelessly passes content from a cable television provider to a transmission system.

Referring next to FIG. 3, an embodiment of a program delivery system 300 is shown which uses a satellite link to distribute programs. A satellite television provider uplinks the program with a first satellite dish 304 to a satellite 308. A transmission system 108 is coupled to a second satellite dish 312. The transmission system 108 converts the signal from the satellite to a format understood by the set top boxes 120. Although not shown in FIG. 3, other satellites, cables, microwave dishes, and antennas could provide the program to the transmission system 108 for distribution to the set top boxes 120. Programs can be stored on the local program servers 204 to allow temporal manipulation of their playback.

Control information passes between the subscriber management system 124 and the set top boxes 120 by way of a wide area network (WAN), a control data channel to each set top box 120 or a bi-directional satellite link. In this embodiment, control data is sent to the set top box 120 by way of a unidirectional control data channel, and data is received by way of the WAN 316. The WAN 316 could be accessed via a DOCSIS modem, a telephone modem or other network connection. Rather than reporting usage in near real-time, the set top box 120 could operate in a "store and forward" mode where the set top box 120 reports usage according to a predetermined schedule such as the middle of every night. Alternatively, the subscriber management system 124 could periodically query the set top boxes 120 through the WAN 316.

Figure 4:
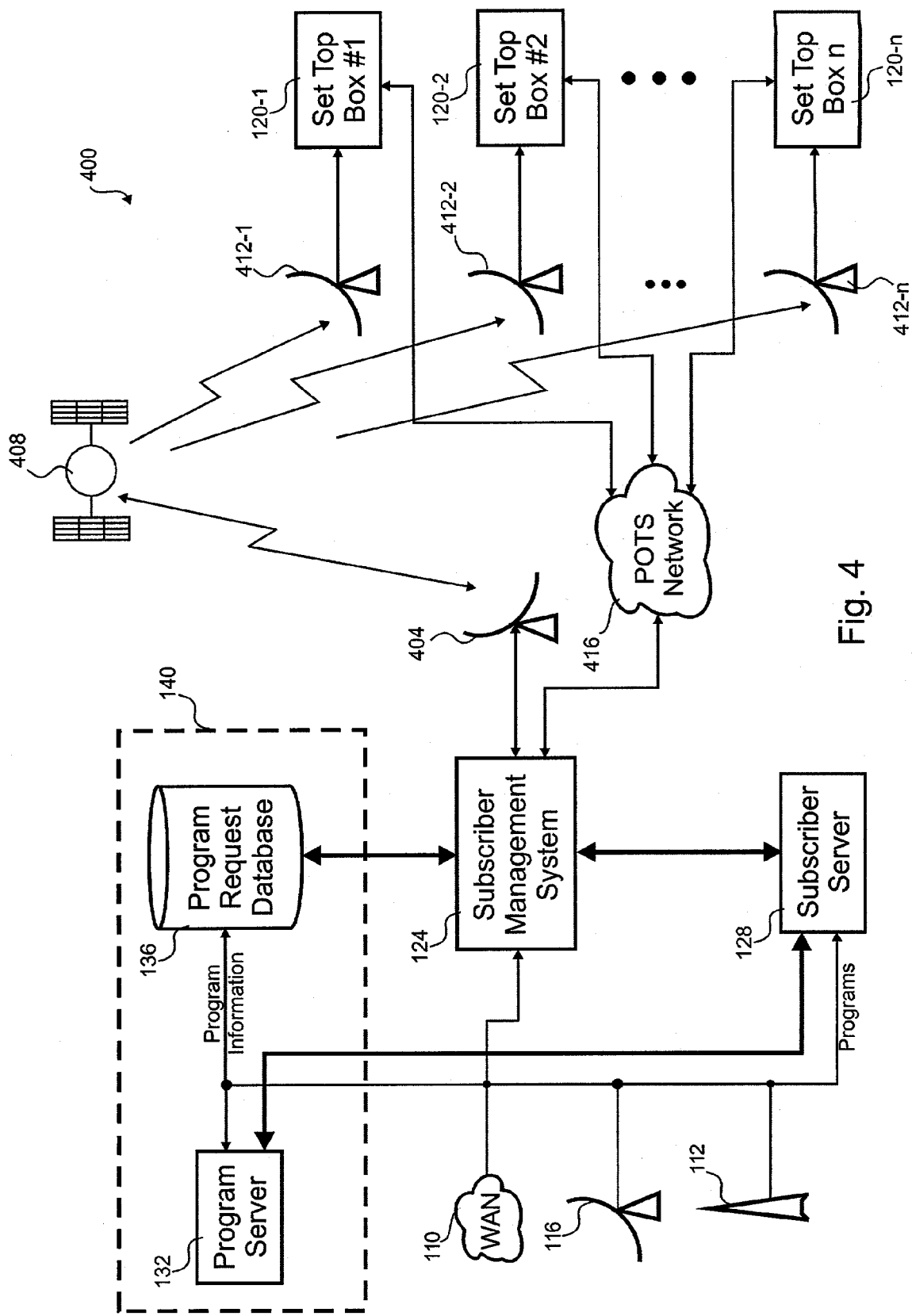
FIG. 4 is a block diagram showing an embodiment of a program delivery system that uses a satellite based transmission system.

With reference to FIG. 4, another embodiment of a program delivery system 400 is shown which places the transmission system 108 in a satellite 408. Although only one satellite television provider is shown in FIG. 4, multiple satellite television providers could uplink to the satellite 408 in other embodiments. A transmission system in the satellite 408 combines programs from a number of content providers and downlinks the combined signal to satellite dishes 412 for each user. The set top boxes 120 decode the downlinked signal.

A telephone modem transceiver in each set top box 120 communicates over a plain old telephone system (POTS) network 416 to the subscriber management system 124 in order to provide entitlement and other information. This embodiment uses the POTS network for bi-directional communication in near real-time. Once a program that requires special authorization is requested, the subscriber management system 124 is queried for entitlement. In contrast, other embodiments could use packet switched networks for this communication such as the Internet.

Figure 5:
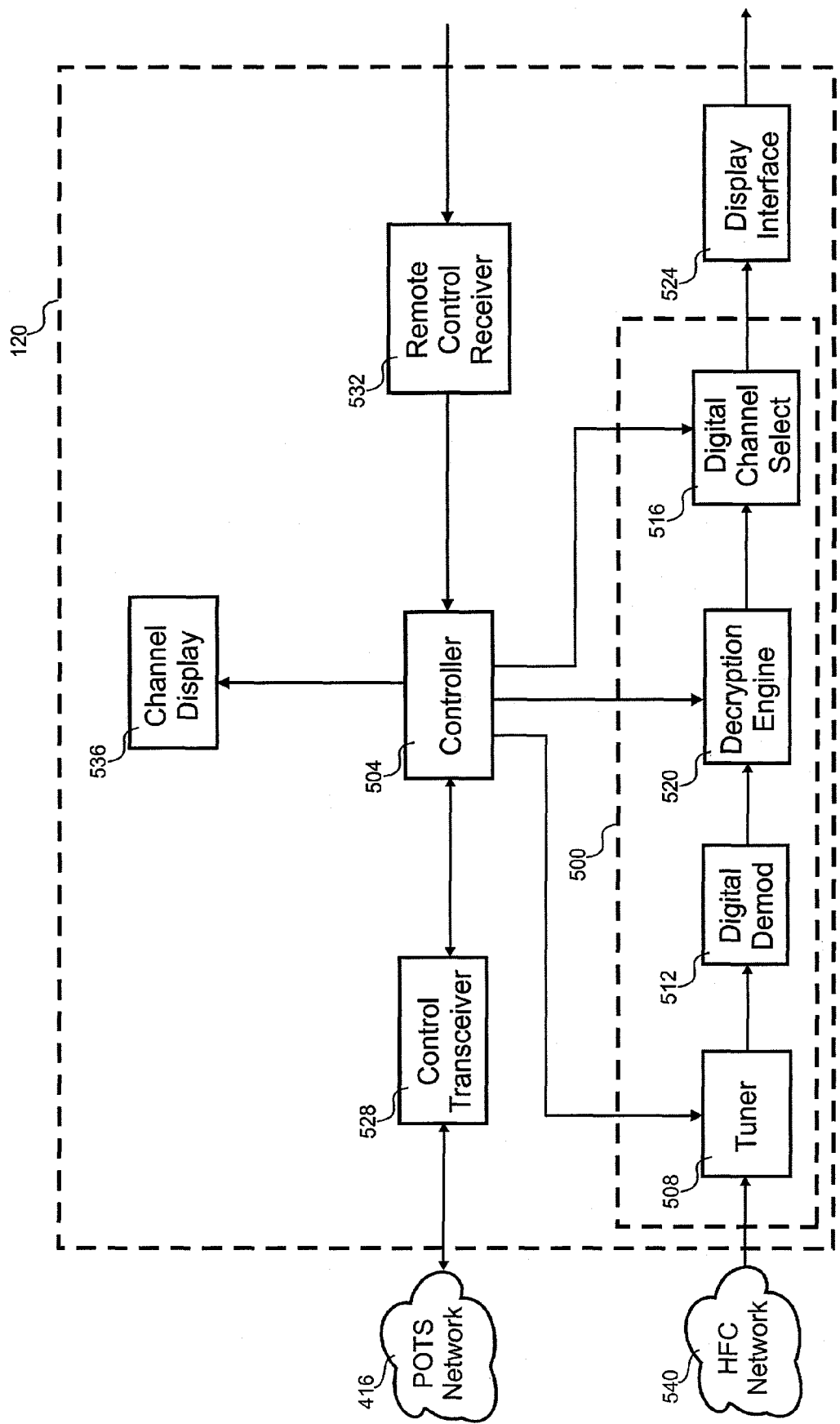
FIG. 5 is a block diagram illustrating an embodiment of a set top box that communicates control data information with a POTS network and receives programs with a hybrid fiber-coaxial (HFC) network.

Referring next to FIG. 5, an embodiment of a set top box 120 is depicted in block diagram form. The set top box 120 recovers a digital channel and presents the digital channel to the television on a display channel selected by the user. Although not shown, the television could also receive analog channels that could be tuned by the set top box or by a cable-ready television. The set top box 120 includes a program receiver 500, a controller 504, a display interface 524, a control transceiver 528, a remote control receiver 532, and a channel display 536. Included in the program receiver 500 are a tuner 508, a digital channel demodulator 512, a digital channel select circuit 516, and a decryption engine 520. The set top box 120 receives programs from a HFC cable network 540, but other embodiments could use other transmission methods. Control information is sent and received through the POTS network 416 or other bi-directional channel.

The program receiver 500 selects the desired digital channel from the frequency division multiplexed signal received from the HFC network 540 of the transmission system 108. A control signal corresponding to a particular carrier channel to be downconverted, is sent from the controller 504 to the tuner 508. The tuner 508 downconverts a selected carrier to an intermediate frequency (IF) carrier. The signal modulating the IF carrier is converted into a digital baseband signal by the digital demodulator 512 whose output is an encrypted MPEG signal. The decryption engine 520 performs decryption of the digital baseband signal to produce a plaintext signal. A key is provided from the controller 504 to enable this decryption. A number of digital channels are interleaved in the plaintext signal. Under the direction of the controller 504, the desired digital channel is removed from the plaintext signal by the digital channel select circuit 516. To allow demuxing the desired digital channel, the program identifiers (PIDs) unique to each digital channel are monitored. At this point, the digital channel is compressed in an MPEG-2 format for this embodiment.

The final step, before the program is in a format suitable for display on a television, involves decompressing the digital channel in the display interface 524. An MPEG-2 decoder in the display interface 524 decompresses the digital channel to an NTSC or PAL format modulated at a frequency that typically corresponds to channel three or four. The television is tuned to channel three or four to receive the program contained in the digital channel. As is well known in the art, the television can also select a composite video or S-video from a composite video, S-video input port, HDTV format, etc. in order to receive the program from the set top box 120.

The controller 504 oversees the operations of the set top box 120. The controller 504 performs all processing input from a remote control, selecting the carrier channel and digital channel and processing control information. The controller 504 includes a look-up table that maps the digital channels and their corresponding carrier channels to display channels. The user can select a display channel in order to view the corresponding content of the digital channel on their television. By using the look-up table, the controller 504 causes the set top box 120 to tune and decode the digital channel selected by the user with the remote control.

When the user requests a program, the subscriber management system 124 finds an available transmission pathway and provides the display channel to the user. When ready to begin viewing, the user requests the display channel with the remote control. The set top box appropriately tunes and decodes the digital channel that corresponds to the selected display channel. In other embodiments, the controller 504 can remap a digital channel to any display channel such as a dedicated club channel.

Control information is sent and received by the control transceiver 528 through the POTS network 416. For example, the set top box 120 may request a program with a control data channel of the transceiver 528 and the subscriber management system 124 may respond with a display channel for that program. This control transceiver 528 includes a modem that modulates data onto the phone line and demodulates data from the phone line. The controller 504 processes all data sent to and received from the control transceiver 528 on the control data channel. Other embodiments could bi-directionally communicate control data information through a packet switched network, cellular data network, wired control channel, microwave link or other known methods.

During playback of a club SVOD program or VOD program, the user can pause, rewind or fast-forward the program with their remote control. The club program is sent to the set top box 120 of the user over a dedicated digital channel. The playback commands are sent through the control data channel to the subscriber management system 124 which controls the subscriber server 128 or program server 132 in order to regulate playback. In this way, a club program can be played back much like a video or audio tape that is locally playing in the VCR or cassette player of the user.

Guide information for linear programs, SVOD, VOD, and stored programs can be either formulated remote to the set top box 120 or by the controller 504. This embodiment receives a digital channel that has all the guide information for a particular user. This guide information could have the selections from the linear program schedule or selections available with control of their playback. The selections that can have playback controlled could be club selections, VOD selections or programs the user has requested be recorded from the linear schedule or elsewhere.

In other embodiments, the controller 504 receives information from the control data channel, processes that information, and formulates the guides with the information. Local storage is used to store the information to formulate the guides. This information could include: program titles, program description, content provider channel and/or call sign, actors, release date, length of program, a promotional information, position of the program in the linear schedule, etc.

The remote control receiver 532 allows the user to input information into the program delivery system 100. Using the remote control, the user sends selections according to menu prompts on the television screen. The controller 504 processes these selections and formulates appropriate prompts after receiving information from the subscriber management system 124. The prompts can be produced by the controller 504 and/or the subscriber management system 124. These prompts allow the user to select a club program for playback or to otherwise access their account. Some embodiments do minimal processing of the information from the remote control receiver and just relays the selections away from the set top box 120 when interacting club programs, VOD programs, and recorded programs spooled from a point away from the set top box 120.

The channel display 536 provides the user with the desired display channel and/or call sign of the content provider. This display 536 could be a LED display, a LCD display, an overlay displayed on the television screen, etc. The user uses the feedback from the channel display 536 to confirm which display channel is currently selected. In other embodiments, the channel display could indicate which user the set top box 120 has determined is currently interacting with the set top box 120.

Figure 6:
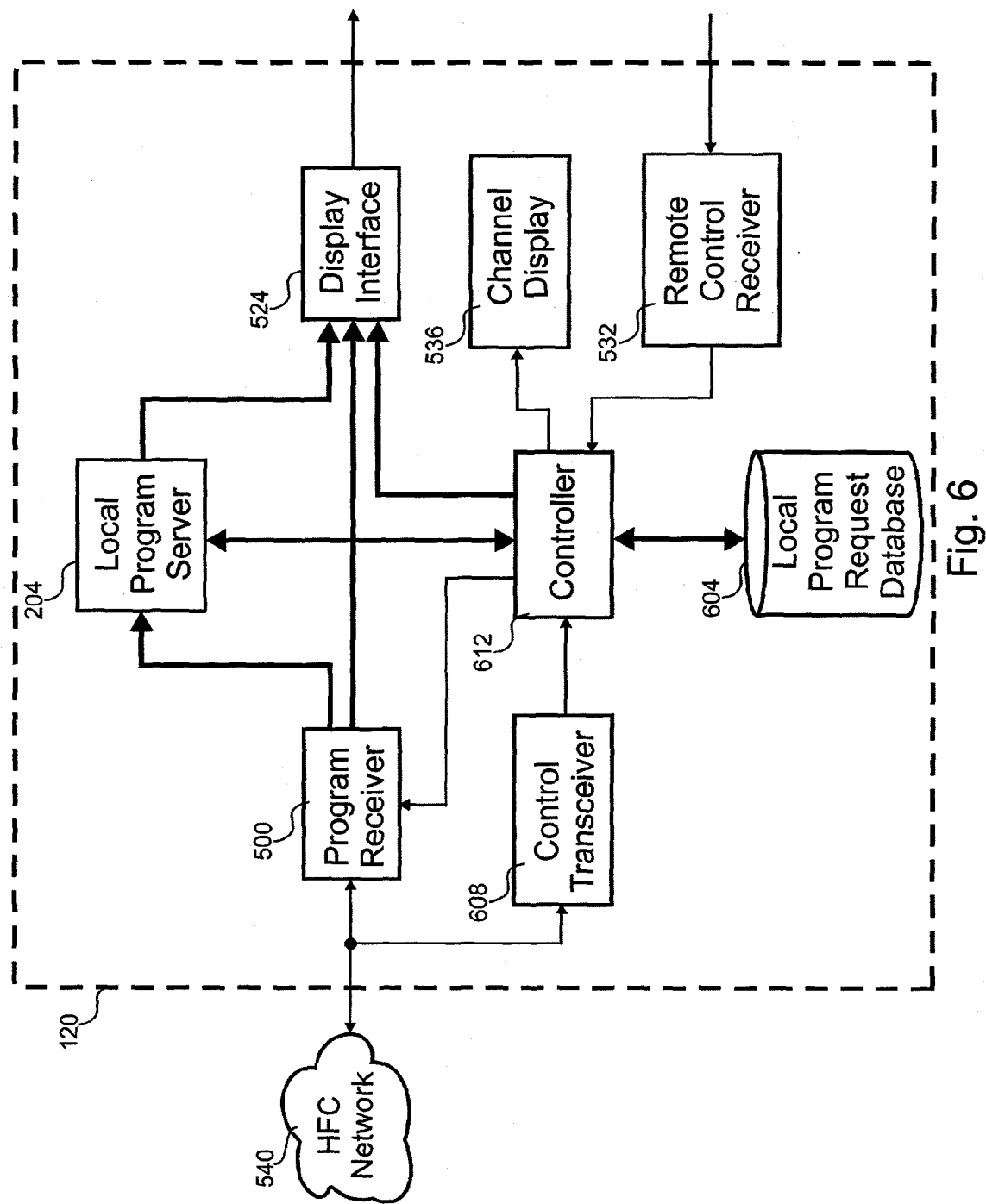
FIG. 6 is a block diagram illustrating another embodiment of a set top box that has content storage capability.

Referring next to FIG. 6, an embodiment of the set top box 120 is shown that stores some programs locally. The MSO, the user and/or a profile for the user may specify or otherwise influence which programs are stored locally in various embodiments. This embodiment includes a controller 612, the receiver 500, the display interface 524, a local program server 204, and a local program request database 604. Club SVOD programs, VOD programs, and/or user-selected programs are periodically downloaded and stored in the local program server 204. This embodiment receives programs through a coaxial cable coupled to a HFC network 540 of the transmission system 108. Additionally, control information is sent and received over this cable. Other embodiments, could use a packet switched network, a bi-directional satellite connection, a packet switched network, wireless transmission, etc. to distribute the programs and communicate control data information.

The controller 612 manages the operation of the set top box 120. Digital channels are selected by the controller 612 and downloaded to the local program server 204 for later viewing or sent directly to the display interface 524 for real-time viewing. The controller 612 also retrieves user specific information, club specific information and programming information from the local program request database 604 in order to entitle the club programs stored on the local program server 204. Promotional information and program information are stored in the local program request database 604.

The controller 612 determines the user currently viewing the program. By monitoring how the user uses the remote control and by monitoring viewing habits, the controller attempts to guess which user is viewing the current program. The time period between pressing keys on the remote, the way channels are changed, the programs being viewed can indicate who is currently viewing the television.

During configuration of the set top box 120, the different users can be entered. For the different users, different profiles are developed over time. The controller 612 proposes the identity of the current user who might currently be using the television. This proposal can be corrected by the current user so as to further train the set top box 120. The guides and other functions of the set top box 120 can be customized for each user. During the configuration process, the users can customize the functionality according to their tastes. With an automatic mode, the controller 612 will attempt to customize the functionality based upon how each user interacts with the set top box 120. For example, the programs can be sorted for a first user who likes only westerns such that those programs are displayed in the guide first.

The local program request database 604 stores information relating to the programs stored in the set top box 120. The information in the local program request database 604 is largely a duplicate of the information on the various program request databases 136 for the content providers 140, but limits the information to the programs stored on the local program server 204. The controller interacts with the local program request database 604 in order to provide program entitlement to users. Some embodiments could use the local program request database 604 and/or the remote program request database 136 to provide entitlement.

In this embodiment, the local program request database 604 stores user specific information, club specific information and programming information. The user specific information includes such things as name, address, set top box address, membership privileges, membership history, user preferences, viewing histories, program sorting information, and available credit. A number of users can have user specific information stored or a combined set of information can be used for all the viewers associated with that user location. The club specific information includes such things as program listings and descriptions; category and/or genre of the programs; promotional clips, audio and/or still images for the programs; coming attractions, digital rights management information, premieres and specials; a membership history summary; and program usage by class of program. Some embodiments could store the promotional clips, audio and/or still images for the programs on the local program server 204 instead of the local program request database 604. For real-time broadcasts, the programming information includes such things as program schedules, digital rights management information, program descriptions, program lengths, release dates, promotional clips of the programs, and upcoming specials.

With the information stored in the local program request database 604, guides of linear programs and guides of stored programs can be formulated by the controller 612 and presented to the user. These guides could include promotional clips of the programs as is explained further below. Some embodiments could also store advertisements on the local program request database. These advertisements could be tailored for the users, such that different set top boxes 120 receive and store different commercials. Commercials for the users of the set top box 120 could be a mix of live commercials and stored commercials. Different users of the set top box 120 could have different stored commercials presented.

A mass storage device, such as a magnetic disk, tape drive, video recorder, optical disk or the like, in the local program server 204 stores the downloaded programs. This embodiment with the local storage allows pausing, rewinding and fast-forwarding the programs stored in the local program server 204. Inexpensive magnetic disks today have over one hundred gigabytes of data storage which allows roughly the same amount of hours of video programming storage or thousands of hours of audio programming in the set top box 120. It is to be understood, that the storage device in some embodiments may hold information other than club related programs, such as VOD programs and programs recorded from the linear schedule. The local program request database 604 could be stored on the local program server 204.

Control information is sent and received by the control transceiver 608. This transceiver 608 demodulates the incoming control data channel having a carrier signal that is typically in the range of 100 MHz and modulates an outgoing control data channel having a carrier signal that is typically in the range of 5-50 MHz. The controller 612 processes all data sent to and received from the control transceiver 608 on the control data channel.

The control data channel is broadcast to all set top boxes 120 associated with the delivery system 100. In order to avoid other boxes 120 acting upon control information meant for the desired set top box 120, control information is addressed with an identifier unique to the desired set top box 120. Additionally, cryptology could be used upon the control information to provide further security from unintended boxes 120 decoding the control information.

Figure 7:
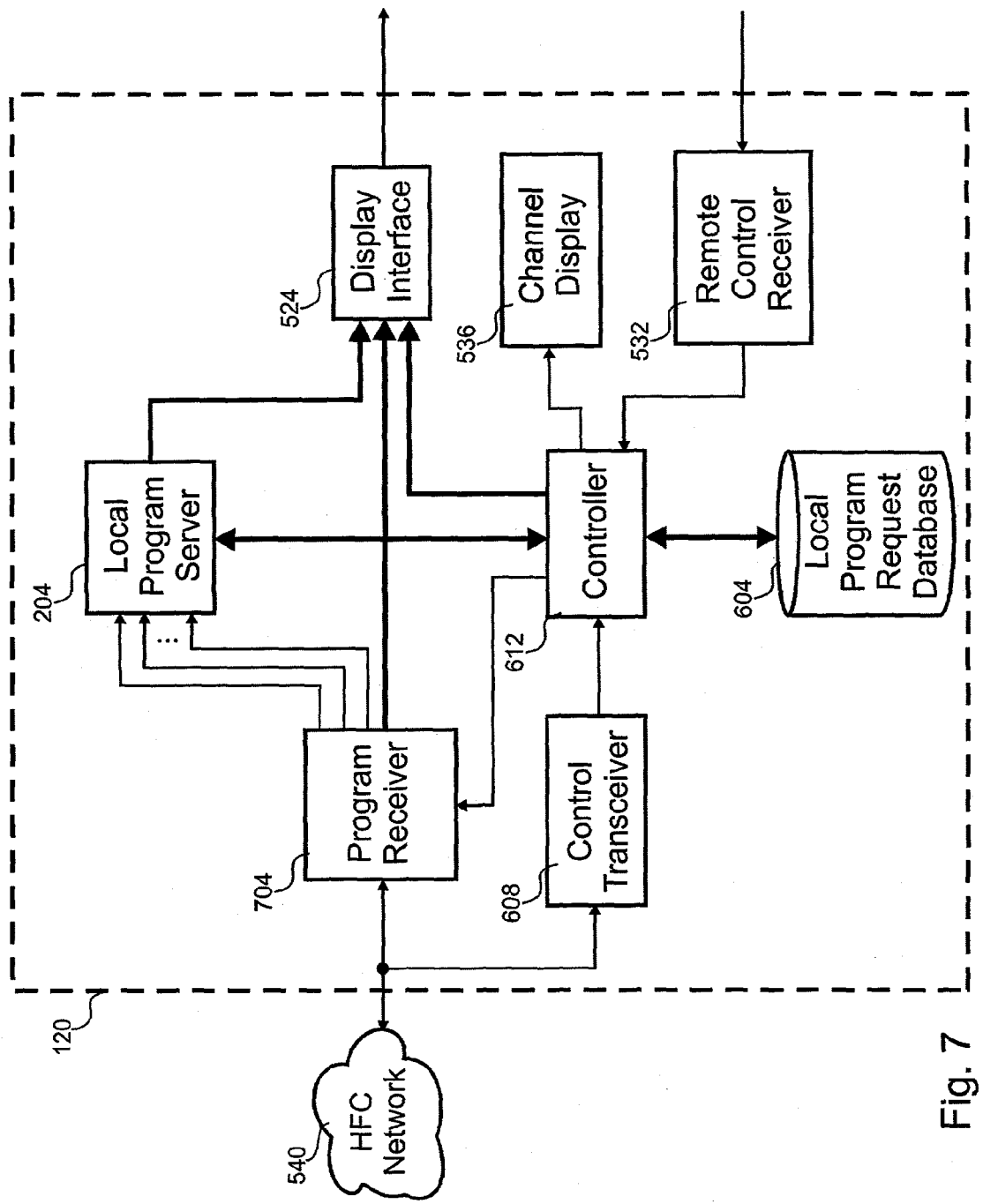
FIG. 7 is a block diagram depicting another embodiment of a set top box that can record a number of programs simultaneously.

Referring next to FIG. 7, an embodiment of a set top box 120 is shown that can record one or more programs simultaneously. A receiver 704 produces multiple digital channels from a chosen carrier channel or a number of chosen carrier channels. The PIDs corresponding to digital channels are monitored in a plaintext MPEG signal in order to demultiplex the plurality of digital channels. These digital channels are coupled to a local program server 204 that stores some or all of the digital channels for later playback through the display interface 524. Typically, only a subset of the digital channels associated with a chosen carrier channel are stored by the local program server 204.

In other embodiments, the PIDs could be ignored and all the digital channels corresponding to a carrier channel are stored. If the user is watching a program, a single decryption engine 520 in the set top box 120 is needed to decrypt a multiplexed and encrypted MPEG signal modulated on the carrier channel. Accordingly, the decryption engine 520 is not available to decrypt another carrier channel containing a digital channel meant for storage on the local program server 204. To avoid this resource conflict, a carrier channel, which contains the multiplexed and encrypted MPEG signal along with the digital channel meant for storage, is written to the local program server 204 without processing. When later playback is desired, the multiplexed and encrypted MPEG signal is read from the local program server 204, decrypted in the decryption engine 520, the desired digital channel is demultiplexed and the digital channel is decompressed. Finally, the decompressed digital signal is then formatted for display on the television.

If a number of tuners were available in another embodiment, a number of multiplexed and encrypted MPEG signals could be recorded at one time from different carrier channels. For example, three carrier channels could be received and stored with three or more tuners. This embodiment avoids the need to decrypt several multiplexed signals at one time.

Figure 8:
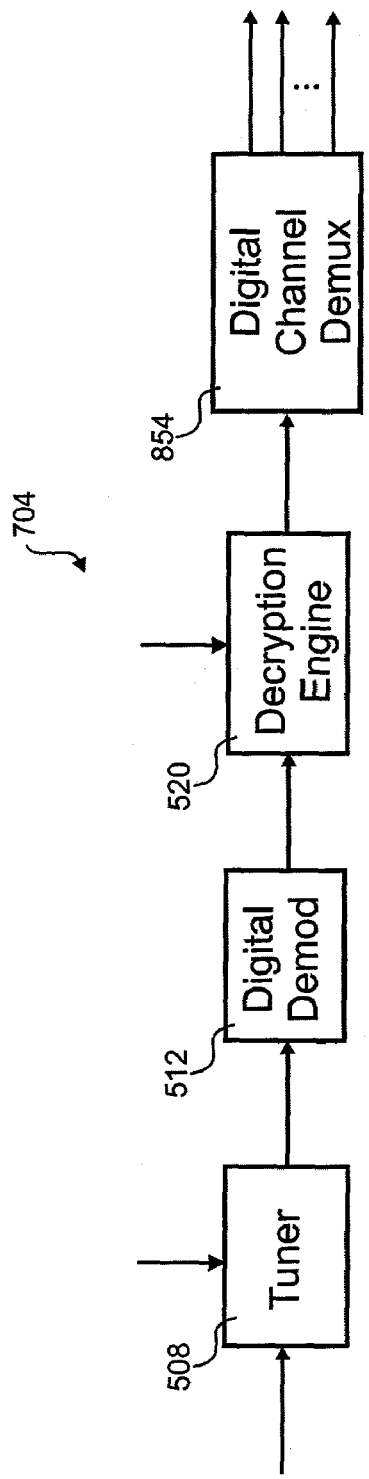
FIG. 8 is a block diagram illustrating an embodiment of a program receiver that produces multiple digital channels simultaneously.

Referring next to FIG. 8, a block diagram illustrating an embodiment of a program receiver 704 that produces multiple digital channels simultaneously is shown. The tuner 508 downconverts the desired carrier channel to an IF carrier from the multiple carrier channels that are frequency multiplexed together. The digital demodulator 512 converts the data signal riding upon the IF carrier to a digital baseband signal, which is an encrypted MPEG signal. The decryption engine 520 performs decryption of the digital baseband signal in order to produce a plaintext MPEG signal. The digital channel demultiplexer 854 monitors the headers and separates the digital channels in the plaintext MPEG signal based upon the PIDs. Each signal from the digital channel demultiplexer 854 corresponds to a different digital channel. These signals are sent to the local program server 204 for storage.

Figure 9:
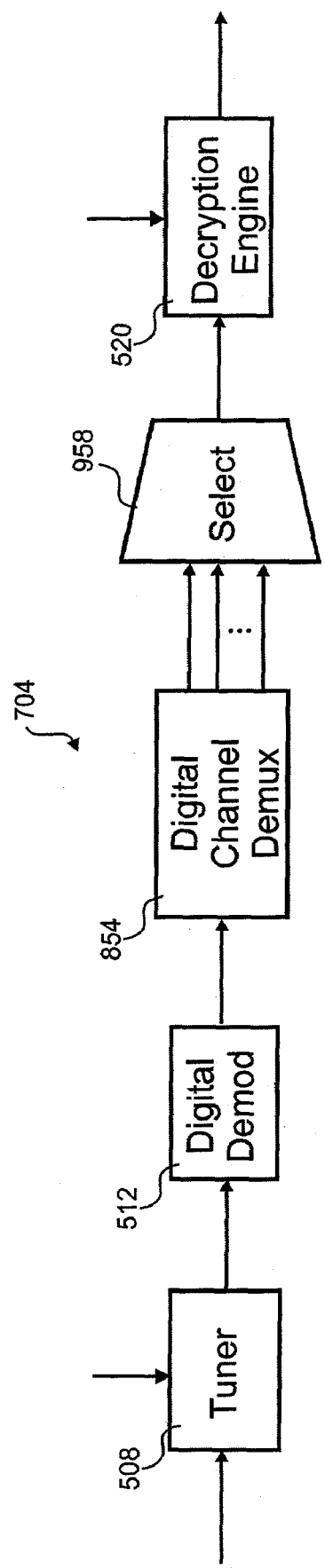
FIG. 9 is a block diagram illustrating another embodiment of a program receiver that also produces multiple digital channels simultaneously.

With reference to FIG. 9, a block diagram illustrating another embodiment of a program receiver 704 is shown. In this embodiment, a digital channel is decrypted in the decryption engine 520 after selection by a select circuit 758. In contrast, the whole multi-channel program stream is decrypted in the embodiment of FIG. 8. It is to be understood that in various embodiments, decryption could be performed on the multi-channel program stream and/or the digital channels contained therein.

Figure 10:
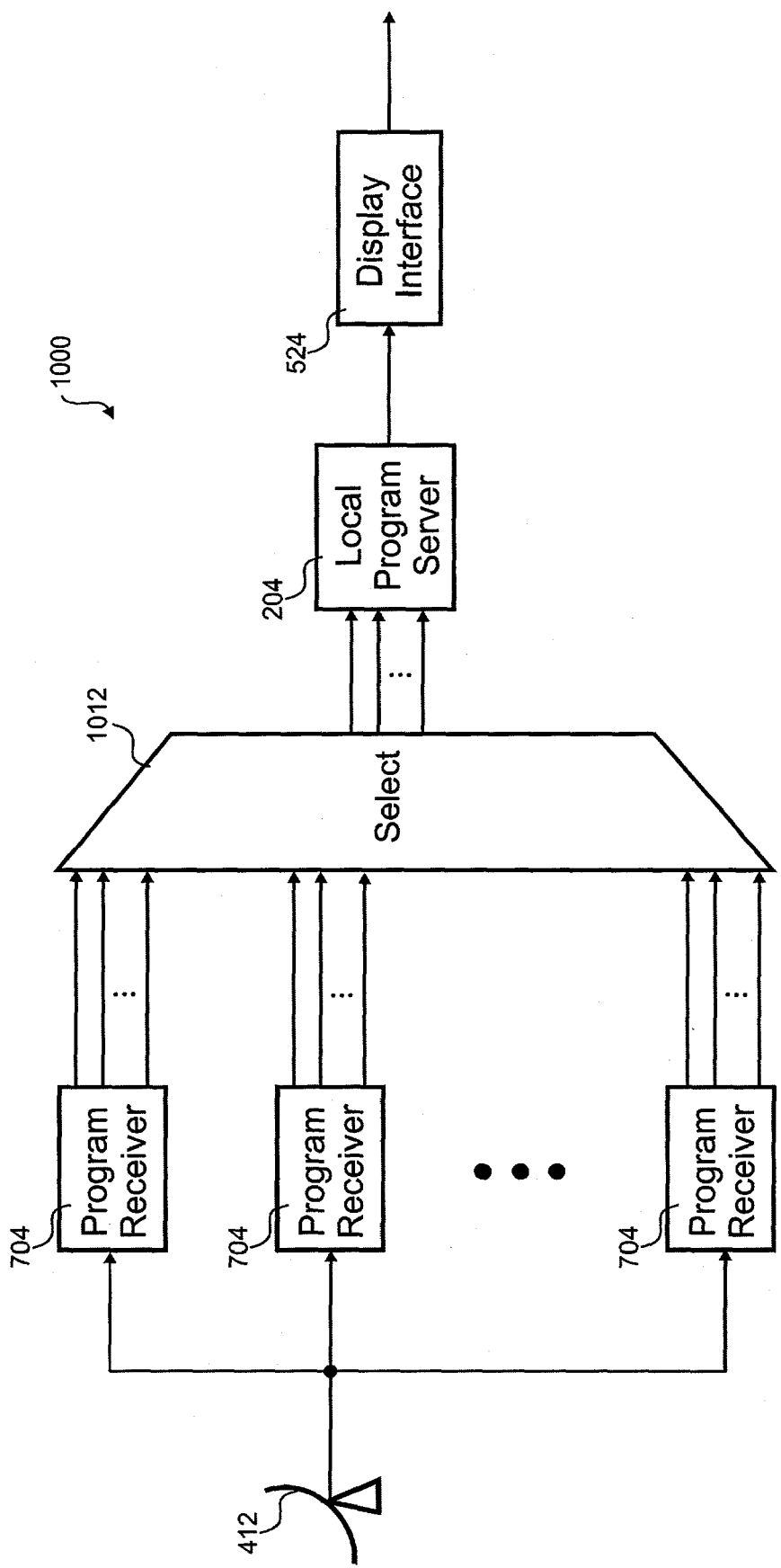
FIG. 10 is a block diagram showing an embodiment of a portion of a set top box that records digital channels that can come from several different carrier channels.

With reference to FIG. 10, a block diagram of an embodiment of a portion of a set top box 1000 is shown which records digital channels that come from several different carrier channels. In this embodiment, a satellite dish 412 receives a number of carrier channels that are combined through frequency division multiplexing. For example, a satellite that the dish 412 receives the carrier channels from could have thirty transponders where each transponder corresponds to a carrier channel. Each transponder, for example, produces a data stream at a rate of twenty-seven megabits per second where each digital channel generally uses two and a half megabits per second. Accordingly, there are approximately ten digital channels on each carrier channel.

A number of program receivers 704 each tune to a different carrier channel in order to produce a number of digital channels which correspond to their respective carrier channel. The digital channels from each program receiver 704 are coupled to a select circuit 1012. The select circuit 1012 reduces the number of digital channels to an amount that can be stored by the local program server 204. Once screened down, the desired digital channels carrying their club programs or other programs being recorded are stored in the program server 204. After storage, the stored programs can be sent one at a time to the display interface 524 for playing on a television or stereo.

Some embodiments may have a network coupled to the local program server 204 such that other televisions or computers coupled to the network could view the stored programs. In these embodiments, a single set top box with multiple tuners could be the source for all televisions in a user location. The user could interact with the set top box through any television on the network to select programs, join clubs, or choose programs for recording.

Figure 11:
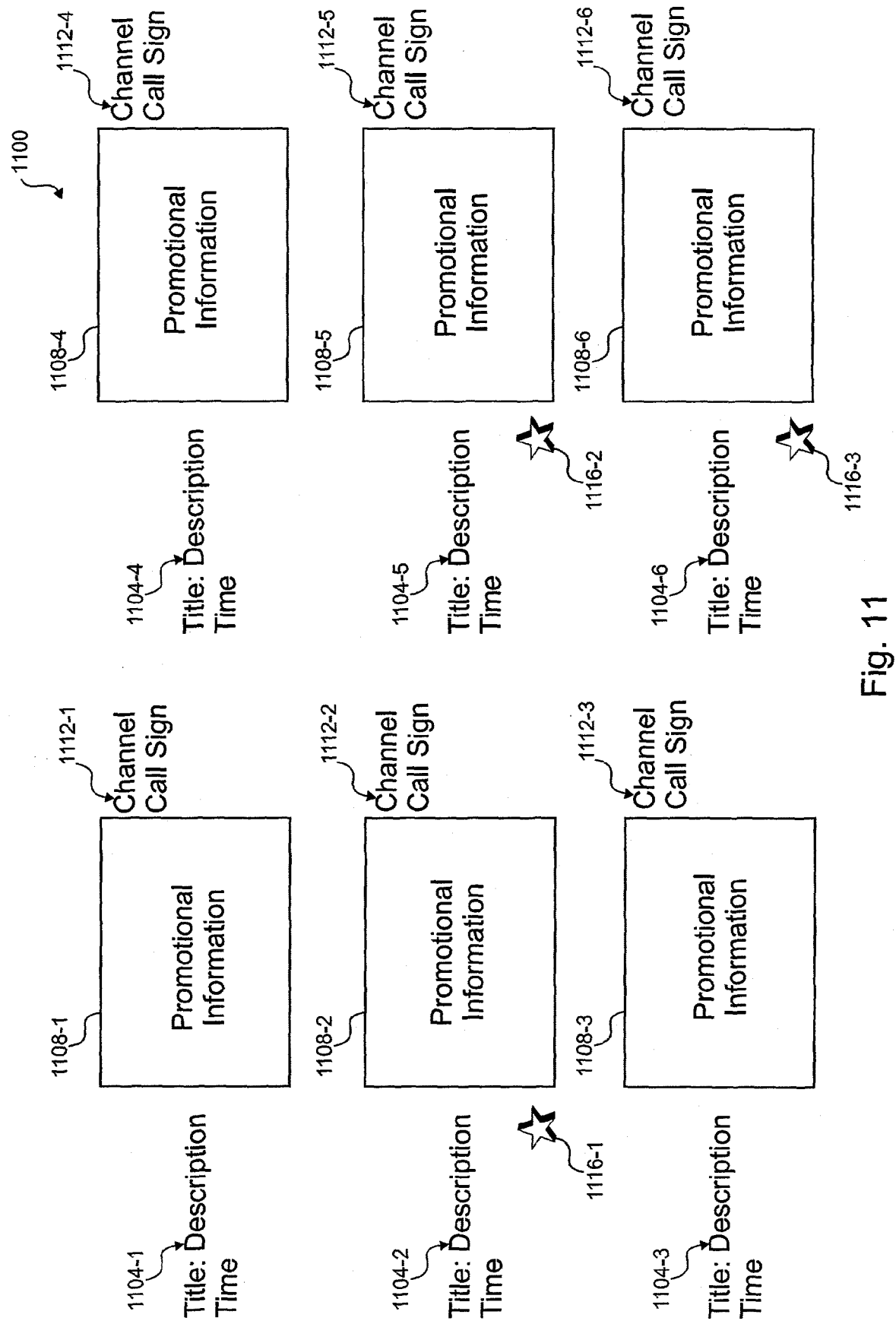
FIG. 11 is a screen shot depicting an embodiment of a guide showing promotional information for a number of programs.

Referring next to FIG. 11, a screen shot depicting an embodiment of a guide 1100 showing promotional information 1108 for a number of programs is shown. The guide 1100 could display the programs on the local program server 204, the SVOD selections available, the VOD selections available, linearly scheduled programs, or a mix of these types of programs. Any guide could be customized according to preferences for the user. For example, the six depicted programs could be from channels the user specified in their profile or could be programs the set top box 120 has determined the user will enjoy. A guide title (not shown) would indicate which types of programs are being displayed in the guide. By viewing the guide 1100 with the six program zones of this embodiment, the user can quickly determine a program to play.

Using keys on the remote, for example, the user can move the focus to any of the promotional information areas 1108. The promotional information could include a video clip, a video clip with audio accompaniment, an audio clip, a still image with audio accompaniment, an animation, an animation with audio accompaniment, a still image, a plurality of still images, and/or a plurality of still images with audio accompaniment. When a particular zone is in focus, any sound for that image is played while the sound for the other images is muted. Further, moving focus to a particular zone may highlight that promotional information 1108 and provide enhanced summary information 104 for that program. For example, a larger version of the image 1108 could be displayed when that zone is in focus. In some embodiments, the image 1108 may switch between two possibilities when that zone is in focus. For example, a static image could be shown until that zone is brought into focus where a moving image or animation is presented.

By pressing a button on the remote while focus is on a particular image 1108 or zone, the corresponding program can be played. A menu page or menu overlay may be activated by that button to allow playing a program, subscribing to a club or subscription service for that program, authorizing a one-time fee to view the program, playing or deleting a stored program, etc. In some embodiments, moving focus to a particular zone presents buttons on the guide screen corresponding to some of these options in lieu of a separate menu page or menu overlay.

The promotional information 1108 and/or program descriptions 1104 may be made general to a number of programs. For example, a clip 1108 for a series of programs could be reused for each program in the series where the program descriptions 1104 could change for each episode. In some embodiments, there may be default promotional information 1108 and/or program descriptions 1104 for a particular channel such that if no specific information were provided the default promotional information 1108 and/or program descriptions 1104 could describe the particular channel.

The six zones of the guide 1100 each describe a particular program with summary information 1104, promotional information 1108, and content provider information 1112. The program could be an audio or video program. Summary information 1104 is provided for each program and includes: a title, a description, a program length, a start time for programs in the linear schedule, actors, a content advisory rating, a reviewers rating, and/or other information.

Each zone has promotional information 1108 which could be a static or dynamic image, such as a picture, advertisement, video clip, audio clip, slide show of images, animated image, etc. This promotional information 1108 is stored in the local program request database 604 for this embodiment, but could be stored remote to the user location in other embodiments. Where the program associated with the zone is a currently playing program, a live view of that program could be displayed. Where there are not enough tuning resources to dedicate a tuner for each currently playing program, the tuner resources could cycle through the images of the live programs such that each flashes a static image or small clip before the tuner resource is switched to the next zone.

Each zone also has content provider information 1112. In this embodiment, the content provider information includes a channel and call sign associated with the content provider, but could also include a logo, a language, a nationality, etc.

Some zones in the depicted embodiment of the guide 1100 further include a notification symbol 1116. A notification symbol 1116 indicates that the program associated with that zone is immediately available for playback with full or partial control of the playback. Those without the symbol are part of the linear schedule and can be watched while the program is broadcast, but are not currently stored so as to allow rewinding, etc. The notification symbol 1116 could have a number of variants to indicate the type of program (e.g., stored program, SVOD or club program, VOD program), limited availability of the program, a charge is associated with viewing the program, the content provider associated with the program, etc. The notification symbol can be a static icon or an animated icon.

Figure 12:
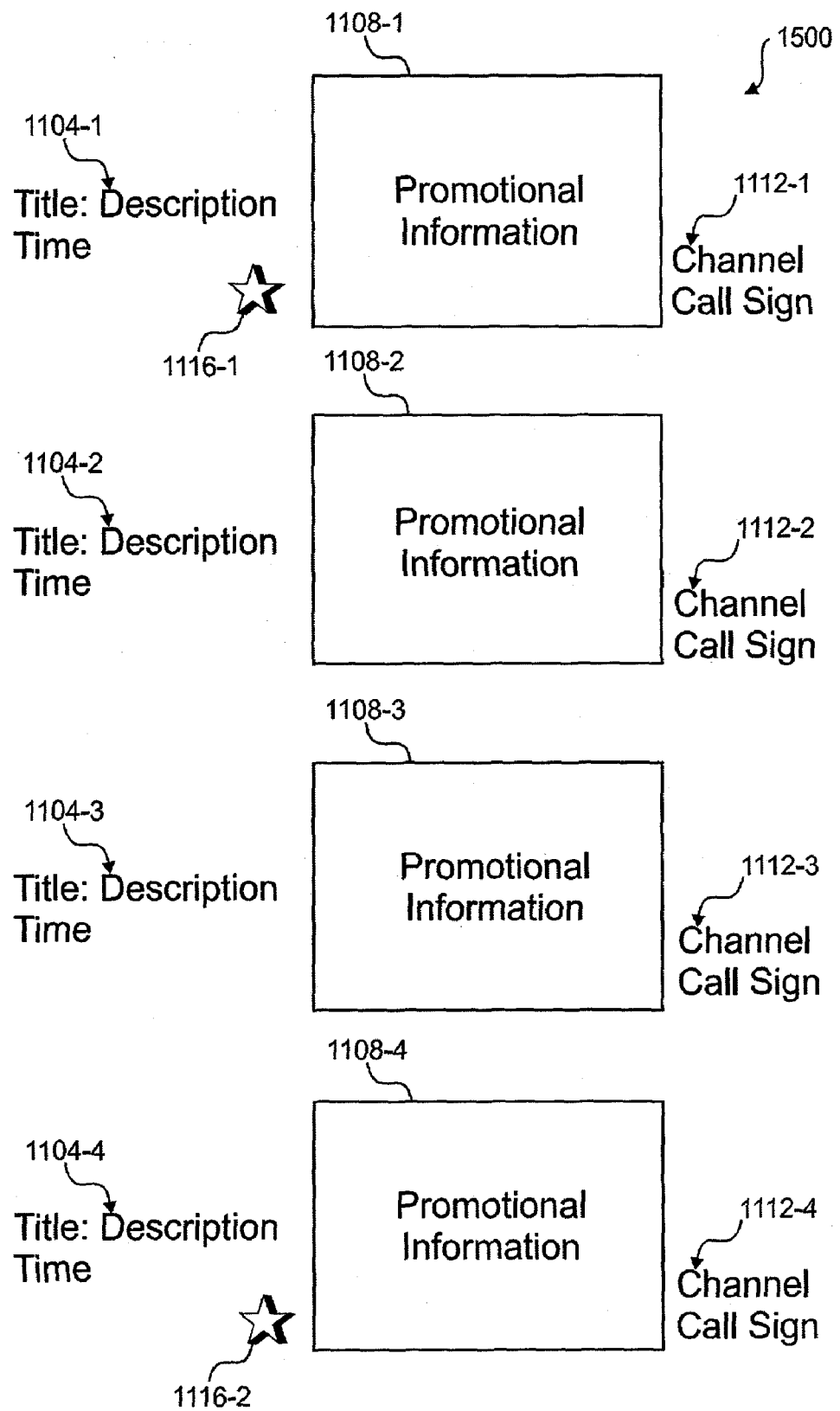
FIG. 12 is a screen shot illustrating another embodiment of the guide showing promotional information for a number of programs.

With reference to FIG. 12, a screen shot illustrating another embodiment of a guide 1200 showing promotional information 1108 for a number of programs is shown. This embodiment has four zones to display information on four programs at a time. These four zones could share the screen with a grid of program guide information such that it were situated to the right or left of the program grid. Other embodiments could have any number of zones for any number of programs. As the resolution of display screens increase so can the number of zones such that the promotional information 1108 has adequate resolution. For example, a HDTV system could have more zones in a guide than the resolution of a NTSC system could support adequately.

Figure 13:
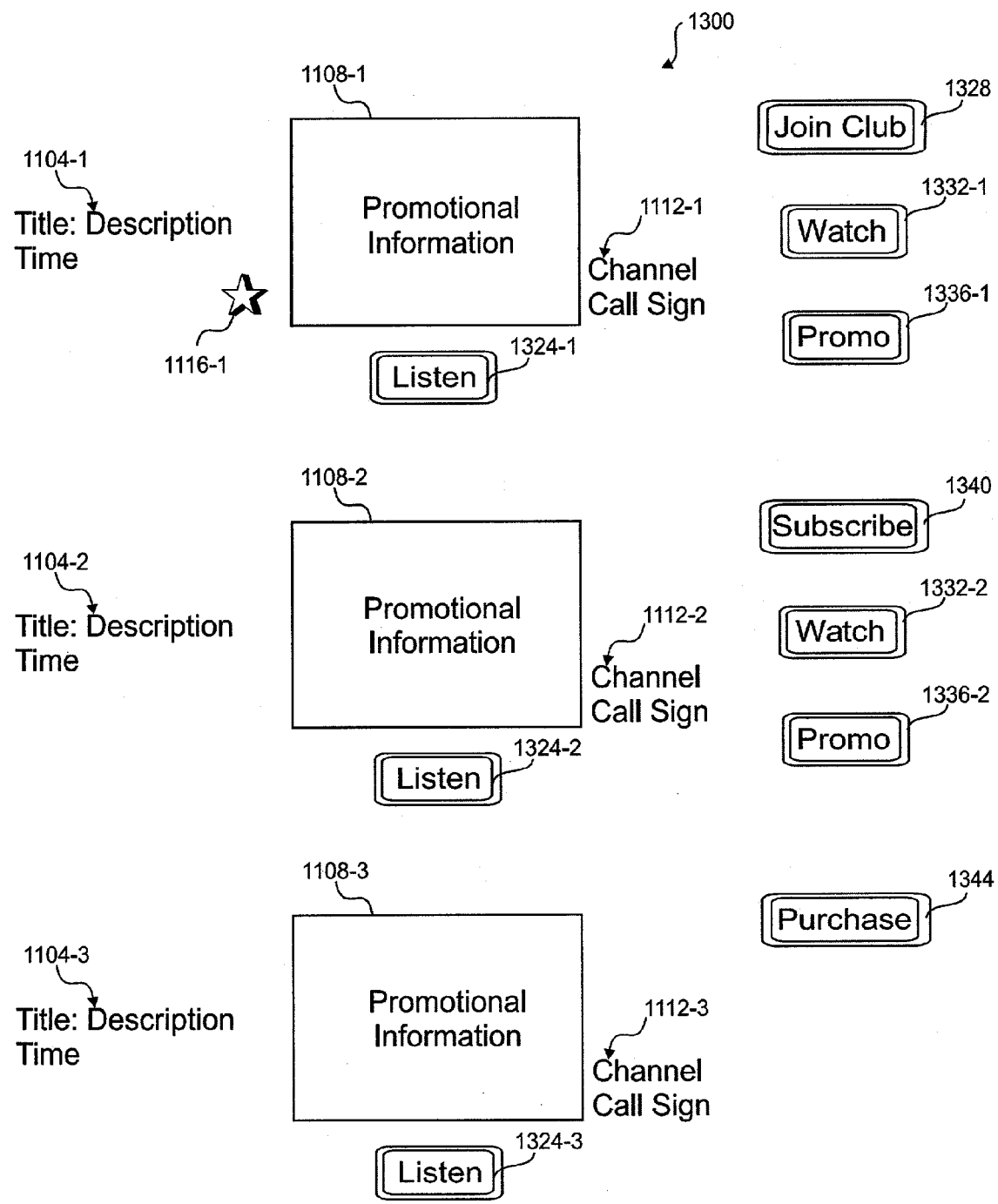
FIG. 13 is a screen shot illustrating another embodiment of the guide showing promotional information where the user have several options for playing the promotional information.

Referring next to FIG. 13, a screen shot illustrating another embodiment of a guide 1300 showing promotional information 1108 is shown where the user has several options for playing the promotional information 1108. This embodiment has three zones respectively associated with three programs. Virtual buttons are provided on the screen to perform certain actions. Cursor keys, a mouse or the like are used to focus and select the buttons.

In the first zone, a SVOD program is showcased as indicated by the notification symbol 1116-1. The SVOD program appears in both the linear schedule and has a stored version that can be played anytime with full control of playback. The first promotional information 1108-1 could be of the program being played or could be of a promo associated with the program. The live program is played by activating the "watch" button 1332 when the live program is currently playing. A "listen" button 1324 allows activating audio for particular program information 1108, which automatically deactivates any audio being played for other zones. Where the live program is not currently playing, the "watch" and "promo" buttons 1332, 1336 disappear and the promo clip is played. If the user is not a club member, a "join club" button 1328 is displayed such that the user can request club membership to allow playing the program.

A live program from a premium content provider is shown in the second zone. Premium content providers typically require a subscription to view their programs. In this embodiment, a "subscribe" button 1340 is displayed for non-subscribing users to begin the process of becoming a subscriber. The "watch" button 1332 and "promo" button 1336 allow switching the second promotional information 1108-2 between live playback of the program and a promo clip of the program. For non-subscribers, the live playback may be crippled in some way by limiting the time the user can watch the live show to a small period, such as five seconds; showing a slide show of frames separated in the program by some interval, such as one second; showing a reduced resolution version of the live program; showing a black-and-white version of the show; showing the show without sound; etc.

A third zone of the guide 1300 relates to a VOD offering that is stored and can be played with full control of playback. The third promotional information 1108-3 shows a promotional clip of the program shown in a loop. In other embodiments, the third promotional information 1108-3 could be a static image until focus is changed to the third zone, whereby a promotional clip replaces the promotional information 1108-3. A "purchase" button 1344 begins a process whereby the user can buy a viewing of the program. After the purchase, the user may be given a window in which the program is available for viewing with control of playback, such as a one-day period, before another purchase would be required for further viewing. In some embodiments, the period could be a week, a month, a year, or an indefinite period.

Figure 14:
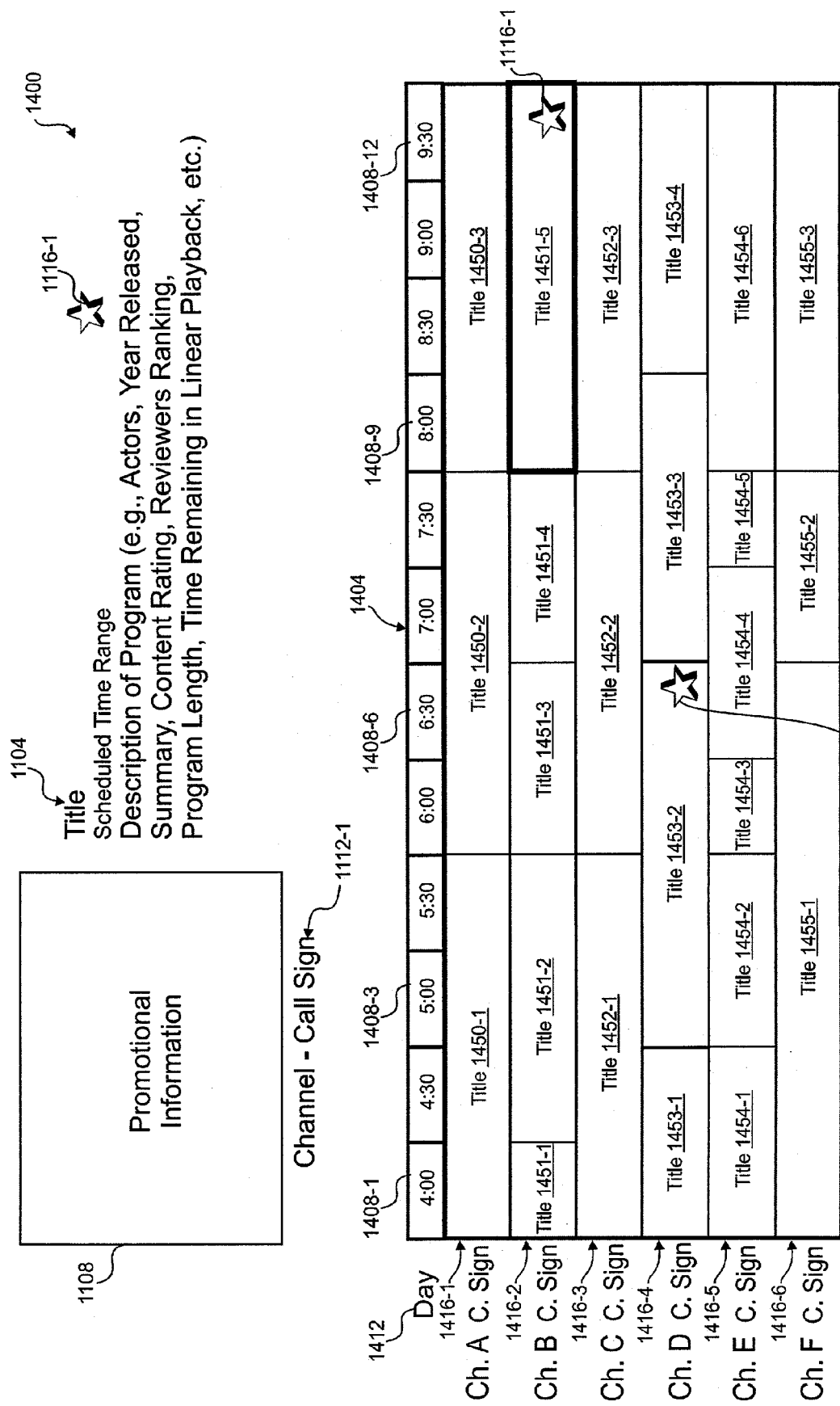
FIG. 14 is a screen shot illustrating an embodiment of a guide showing a linear schedule of programs where a program can be selected for further information.

With reference to FIG. 14, a screen shot illustrates an embodiment of a guide 1400 showing a linear schedule of programs 1404 where a program can be selected for further information. In this example, a program 1451-5 playing between 8:00 and 10:00 and on Channel B 1416-2 is selected as indicated by the bold outline, but other embodiments could change the color, shading, or otherwise indicate that a program is selected. Selection of the program automatically brings up the promotional information 1108 for that program 1451-5. Promotional information 1108, a program description 1104, any notification symbol 1116, and a channel and call sign 1112 is shown for the selected program 1451-5. Pressing the select button on the remote brings up a window that allows watching the program in the guide 1400 or fullscreen. If the user is not authorized for watching a SVOD, VOD or premium content program, the user is solicited to upgrade their service to allow watching the program.

The linear schedule of programs in this embodiment is arranged in a grid of times along one axis and digital channels along the other axis. Although this embodiment receives programs on digital channels, any of embodiments in this application could receive programs on analog channels, packet switched channels, etc. This embodiment divides the time axis into half-hour increments 1408 for a total of six hours, however, other embodiments could use different increments 1408 and a different total. A day of the week 1412 is in the upper-left corner of the program grid 1404. Six channels 1416 are displayed in this embodiment, while other embodiments could have more or less channels displayed. Each channel 1416 in this embodiment has a channel number and call sign displayed, where each program in the grid 1404 displays a title for each program. The programs may be of different lengths, for example, channel F 1416-6 has a three hour program 1455-1, a hour show 1455-2 and a two hour shows playing between 4:00 and 10:00. A notification symbol 1116 for the selected program 1451-5 and another program 1453-2 indicates the program is also immediately available with playback manipulation.

Figure 15:
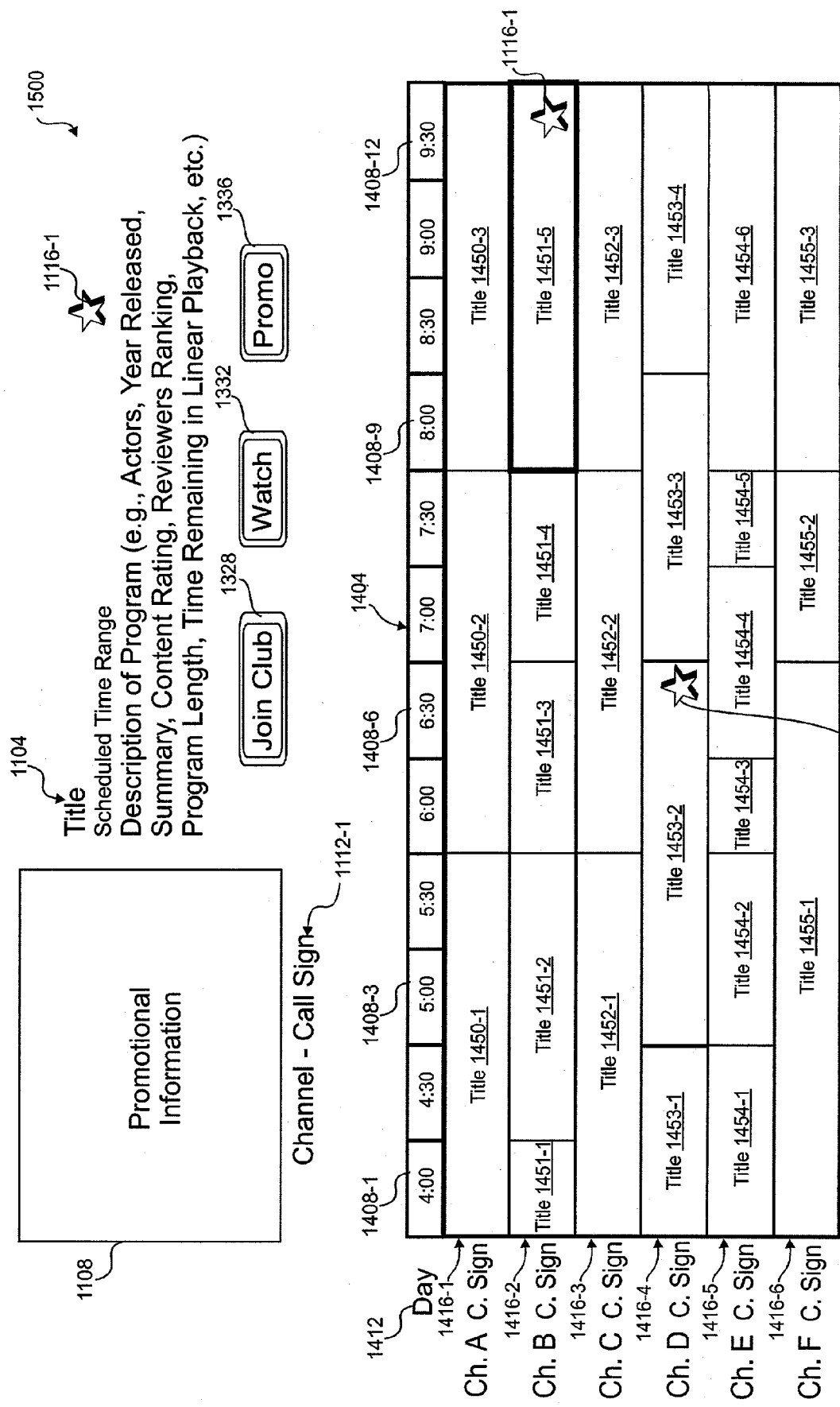
FIG. 15 is a screen shot illustrating another embodiment of the guide showing a linear schedule of programs where a program can be previewed.

Referring next to FIG. 15, a screen shot illustrates another embodiment of the guide 1500 that shows the linear schedule of programs 1404 where a program can be previewed with various control buttons. The buttons are shown for the selected program and may change to suit the type of program 1453-2 being displayed. In this embodiment, a SVOD program 1453-2 is being displayed in detail in the top half of the guide 1500. A "join club" button 1328, a "watch" the program live button 1332, and a "promo" clip or image play button 1336. The "watch" the program live button 1332 is only displayed if the program is currently playing. If the user is already a club member, the "join club" button 1328 could be replaced by a "SVOD" button that would begin the program from the beginning with full control of playback. Other types of programs could have other buttons as appropriate for their respective service.

Figure 16:
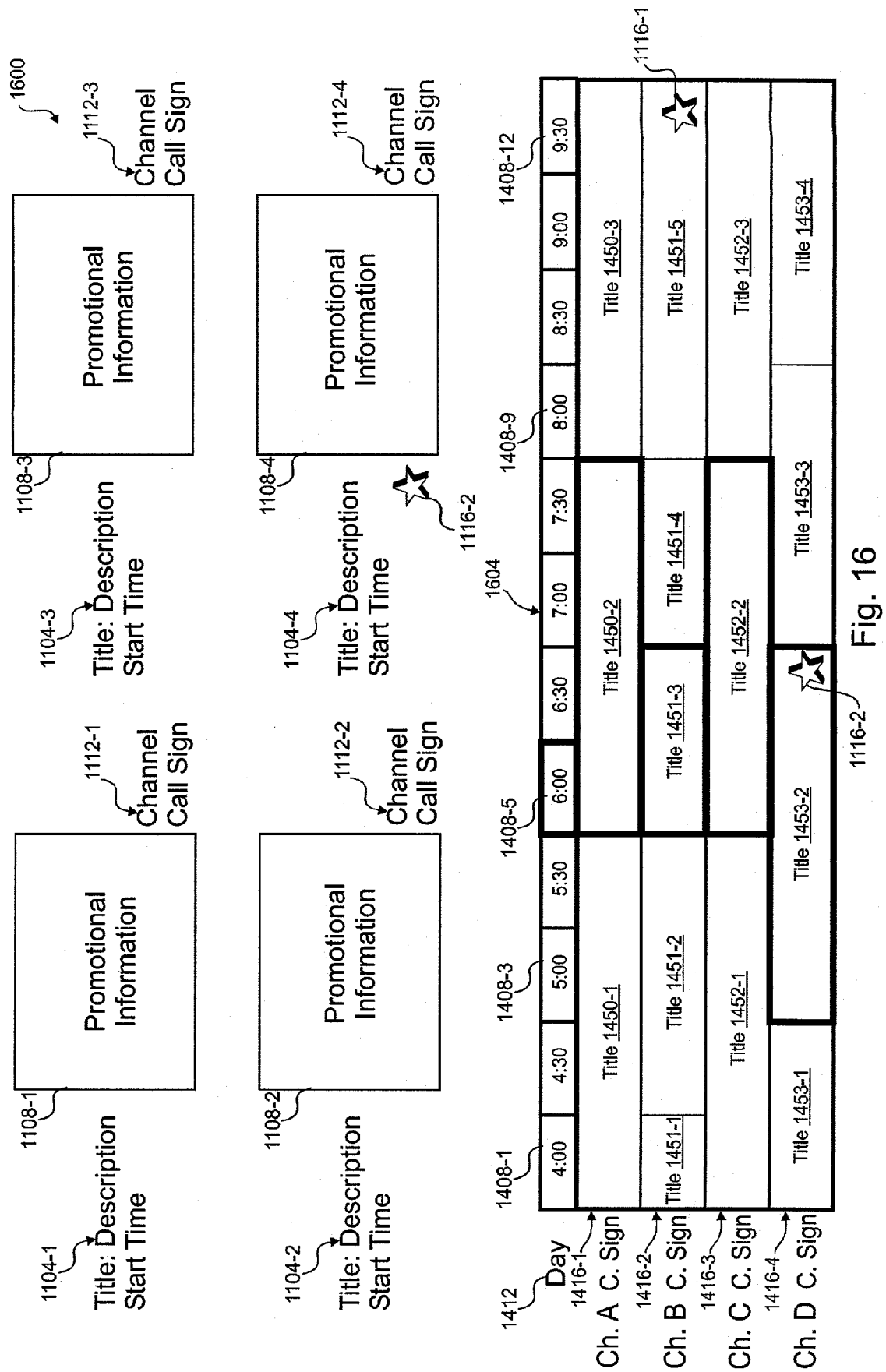
FIG. 16 is a screen shot illustrating another embodiment of the guide showing a linear schedule of programs where a column of programs can be selected for further information.

With reference to FIG. 16, a screen shot illustrating another embodiment of the guide 1600 shows a linear schedule of programs 1604 where a column of programs can be selected for further information. Where a time column is selected, all the programs playing during that time are detailed in the top portion of the guide 1600 with promotional information 1108, description information 1104 and content provider information 1112. In this embodiment, four channels 1416 are displayed in the bottom portion of the guide 1600 with four detailed programs in the top portion of the guide 1600. By selecting a particular program in this embodiment, the guide transforms to detail that single program such as is shown in the embodiments of FIGS. 14 and 15. Selecting a column switches back to the guide 1600 shown in FIG. 16. Some embodiments may have the same number of channels 1416 regardless of whether a single program or a whole column of programs are detailed. Using the remote, the user may increase the number programs detailed in the top portion and the number of channels displayed in the guide 1600.

This embodiment allows selecting a whole column of programs for more detailed information, other embodiments could also allow selecting a row of programs for more detailed information such that a sequential number of programs for a given channel 1416 is displayed. For example, Channel A 1416-1 could be selected by focusing on the call sign. This would detail three programs in the top half of the guide. Since the top half of the guide screen could show one, two, four, six, eight programs easily, selecting a channel with a number of programs between that value could increase the number of detailed programs appropriately. For example, selecting Channel B 1416-2 could detail six programs in the top half of the guide 1600 by pulling the program that starts at 10:00 such that six programs could be detailed at once.

Figure 17:
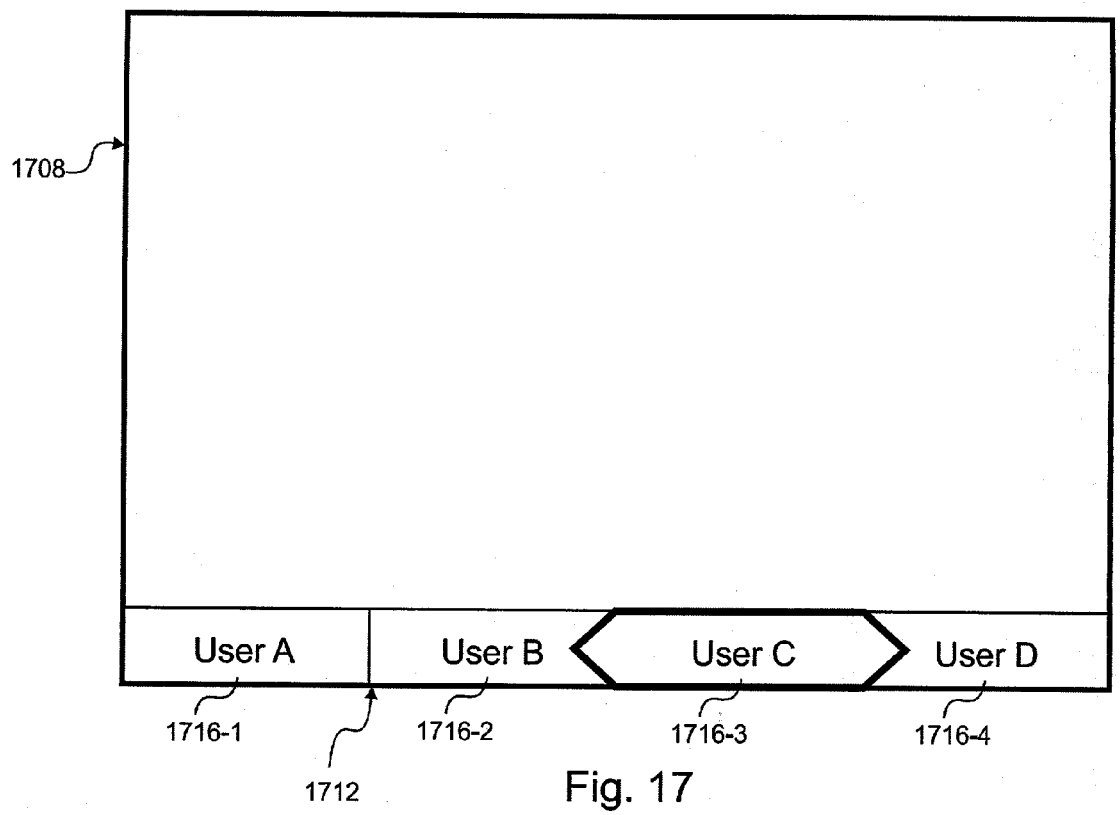
FIG. 17 is a screen shot illustrating an embodiment of a user confirmation footer that shows which user is likely interacting with the set top box.

Referring next to FIG. 17, a screen shot 1708 illustrating an embodiment of a user confirmation footer 1712 is shown that indicates which user is likely interacting with the set top box 120 is shown. In this embodiment, four users 1716 have been assigned to this set top box 120. By comparing the content of the current show against historical data and by comparing the frequency and duration of key presses of the remote control against historical data, the set top box 120 determines who is watching the television currently. Other embodiments could use face recognition to detect the user holding the remote or use other biometric techniques. The determined user in the depicted example is that User C is currently watching, as is indicated by the bolding of the User C indicator 1716-3 of the user confirmation footer 1712.

The remote allows the current user to correct the guessed user presented in the user confirmation footer 1712. The user can move focus to the footer 1712 and navigate the bolding to the user actually viewing the television currently. Some embodiments may put a toggle switch to move bolding right or left with the toggling or may put a wheel knob that also moves bolding right or left. By confirming the current viewing user, the viewing habits observed by the set top box 120 can be assigned to the proper profile. Where only one user will normally use the set top box 120, the user confirmation footer 1712 may be disabled.

By knowing the user currently viewing the television, the functions of the set top box and content available can be customized for that user according to a profile. The guide menus can be customized for the types of content that would appeal to the user. For example, the available SVOD, VOD, linear programs, and stored programs can be sorted according to those that would likely appeal to the user. For example, a sports fan would be presented with sporting events before children's shows. In some cases, the SVOD programs made available from content providers could be affected by the profile of the user. Further, each user could customize the menu colors, sounds, channels, parental control, etc. in their profile such that recognition of the user would activate these customizations. In some embodiments of the set top box 120 with local storage, the unused storage could be used to record programs that are likely to appeal to the user based upon their profile so long as all the tuners are not being used at the time.

Figure 18:
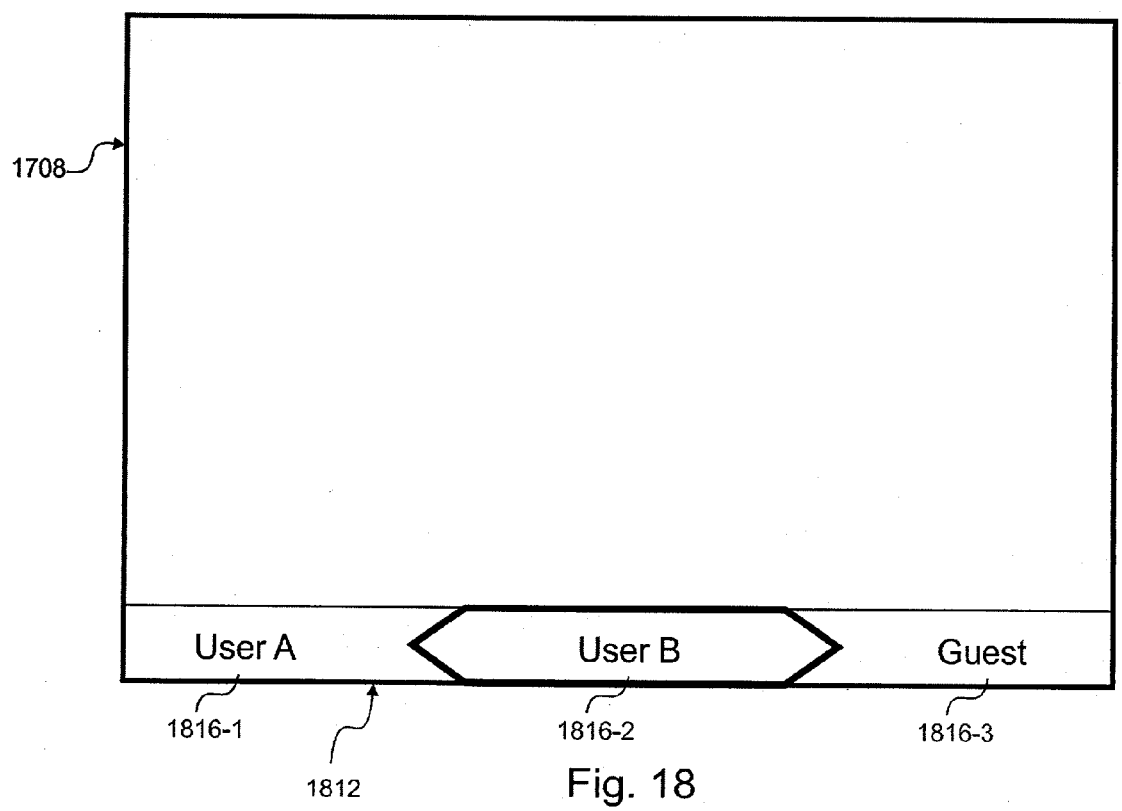
FIG. 18 is a screen shot illustrating another embodiment of a user confirmation footer that shows which user is currently interacting with the set top box.

With reference to FIG. 18, a screen shot 1708 illustrating another embodiment of a user confirmation footer 1812 is shown that indicates which user is currently interacting with the set top box 120. This embodiment has two users configured to have profiles of their viewing habits recorded. Where no data should be attributed to a particular profile, a "guest" user 1816-3 is provided. Where a user that does not have a profile uses the set top box 120, the guest profile can keep the viewing habits of the guest from diluting any particular profile.

There may be other reasons to use the guest profile beyond when a guest is using the set top box 120. Anytime tracking is ill advised, the guest profile can be used. In this embodiment, using the guest profile prevents tracking of the guests viewing habits. Some embodiments could use the viewing habits associated with the guest to form a profile in the same way as creating a profile for User A 1816-1 and User B 1816-2. Alternatively, the guest profile could have default values that do not change with viewing habits.

Figure 19:
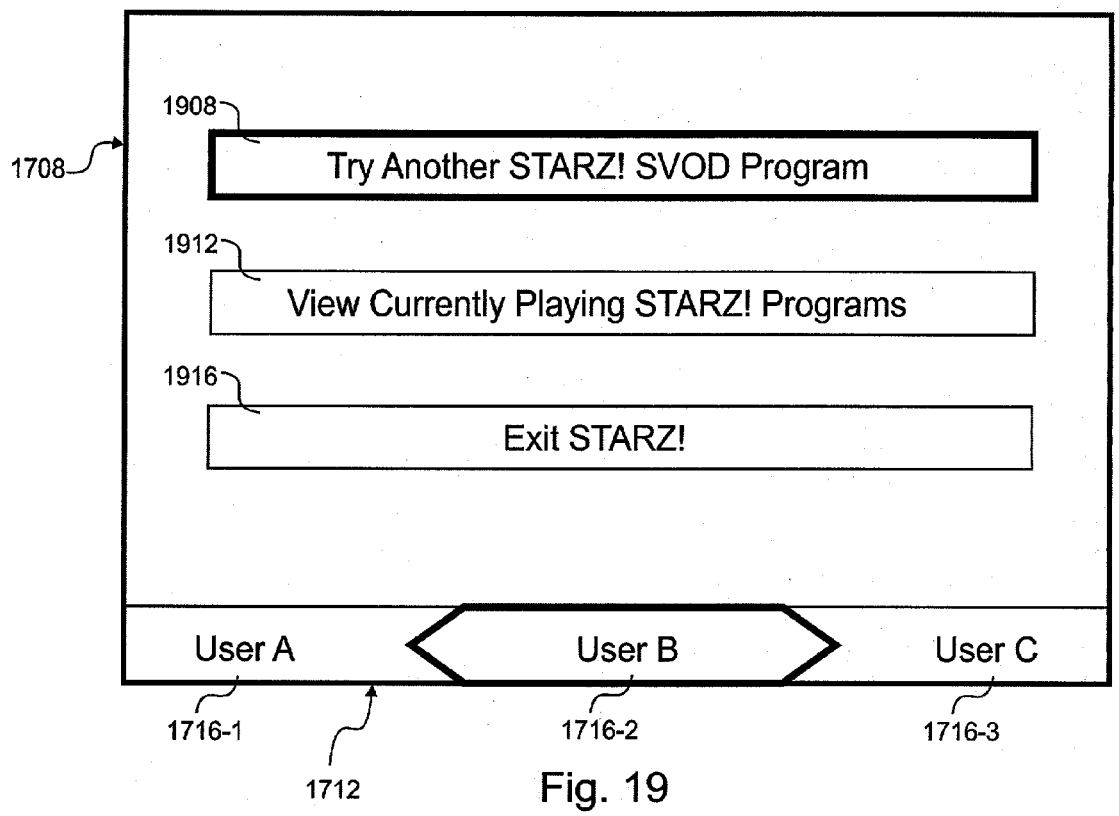
FIG. 19 is a screen shot illustrating an embodiment of an exit menu prompting for further interaction with a particular content provider.

Referring next to FIG. 19, a screen shot 1708 illustrating an embodiment of an exit menu prompting for further interaction with a particular content provider is shown. When a user stops viewing content from a particular content provider, that same content provider suggests alternatives that would continue the interaction between the user and content provider. In this embodiment, STARZ!™ is the content provider. A first menu option 1908 suggests the user go to a guide menu with other SVOD selections offered by STARZ!™. A second menu option 1912 suggest the user go to a guide of linear programs associated with STARZ!™. A third menu option 1916 would exit the user from the STARZ!™ content area back to program guides that show multiple content providers.

The exit menu is presented whenever it is determined the user is exiting from a particular program. An exit could be indicated by a stopping the program, watching the program to its end, choosing to exit playback of a program, skipping ahead in the program to a point equal to the end of the program, etc. Other embodiments may have menu options to suggest guide menus with VOD choices or stored linear program choices associated with a particular content provider. This embodiment of the guide screen 1708 allows the content provider to attempt to keep the user within their content environment.

Figure 20:
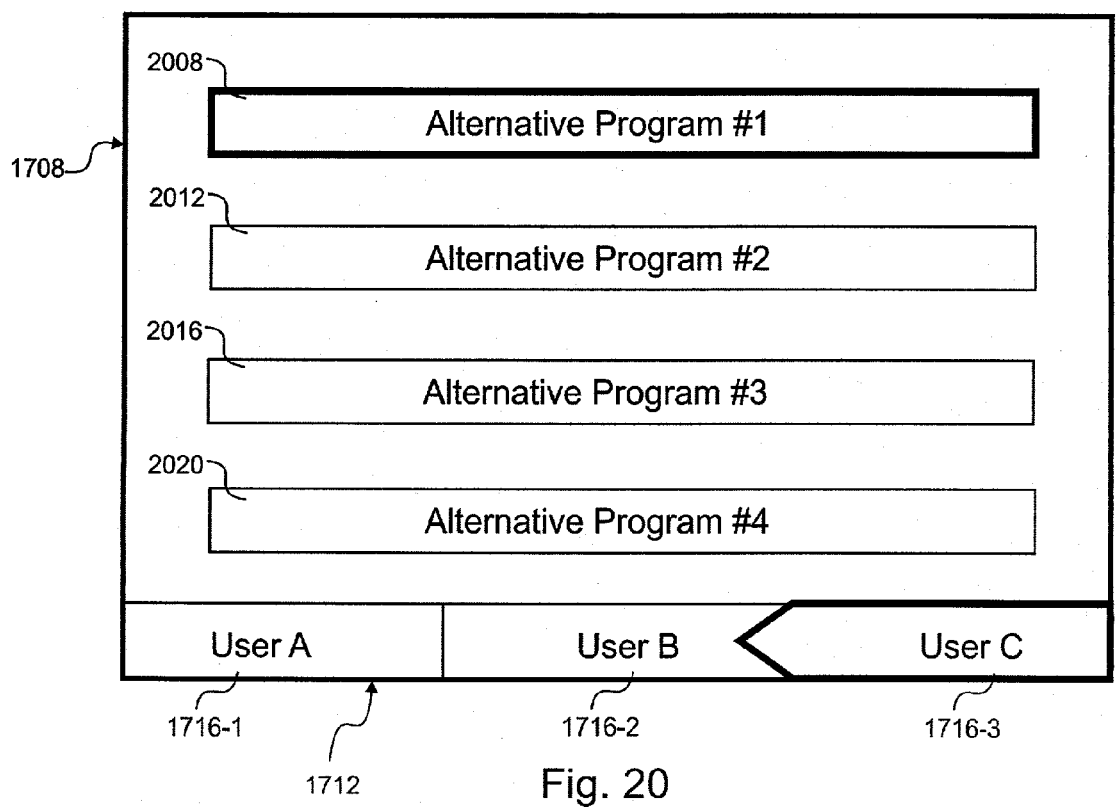
FIG. 20 is a screen shot illustrating an embodiment of an exit menu prompting for further interaction with alternative programs.

Referring next to FIG. 20, a screen shot 1708 illustrating another embodiment of an exit menu prompting for further interaction with a particular content provider is shown. In this embodiment, four alternative programs are suggested for the user. The alternatives can be either associated with the content provider of the exited program or not in various embodiments. The set top box 120 determines the user viewing the exited program. Possible programs are complied and culled down based upon the profile of the user. The culled list of programs is displayed along with a user confirmation footer 1812. If the actual user corrects the determined user, the culled list would be reformulated based upon the actual user's preferences. Some embodiments could display more information on the programs in a manner similar to that of the embodiment in FIG. 15.

Figure 21:
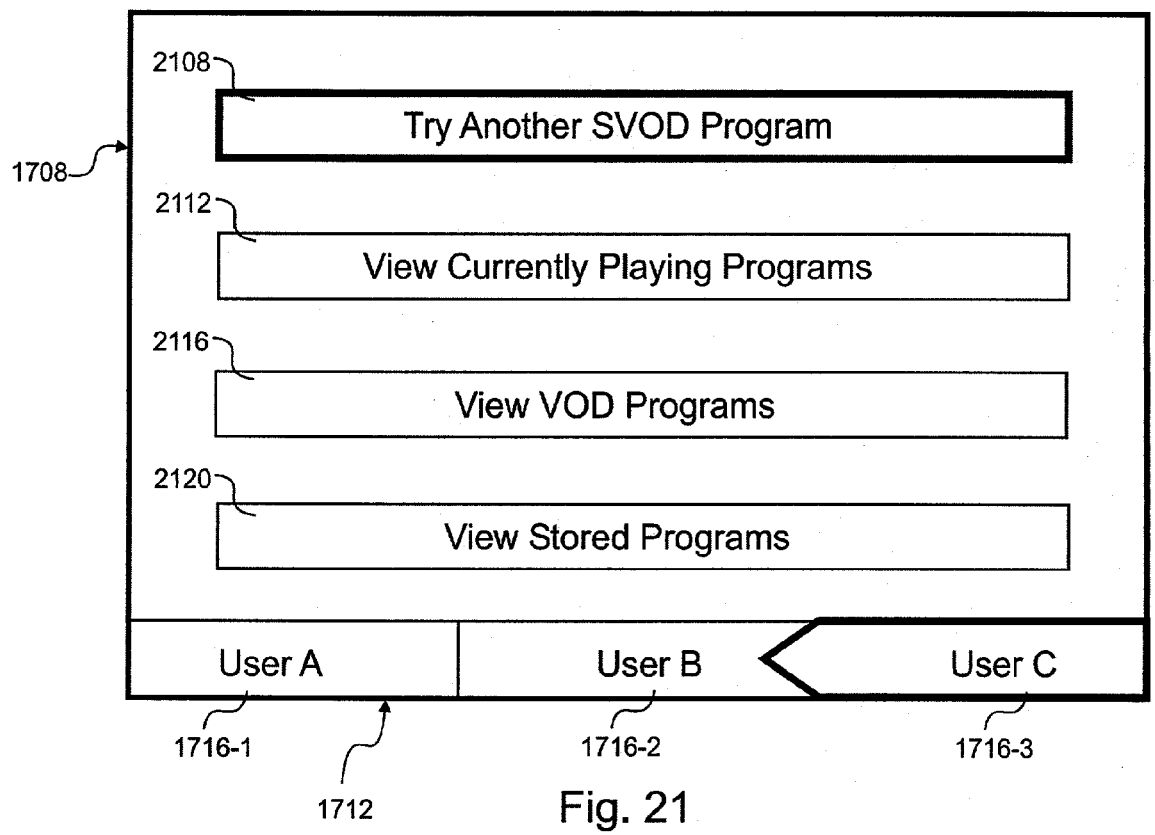
FIG. 21 is a screen shot illustrating an embodiment of an exit menu prompting for further interaction with different types of programs.

With reference to FIG. 21, a screen shot illustrating 1708 an embodiment of an exit menu prompting for further interaction with different types of programs is shown. This embodiment suggests categories of programs not limited to a particular content provider. For example, other SVOD programs 2108, linearly scheduled programs 2112, VOD programs 2116, and stored linear programs 2120 are all menu options presented to the user. These options can be sorted by likely relevance. For example, a particular user may commonly use VOD and not the other options such that the VOD option 2116 is displayed at the top of the list and in the current focus. The button currently in focus is bolded and can be activated with the pressing of a single remote button. Other embodiments could presume the last viewed content type is the most likely to be used next. For example, if a SVOD program was viewed, the SVOD program menu button 2108 is at the top of the list and in focus.

Figure 22:
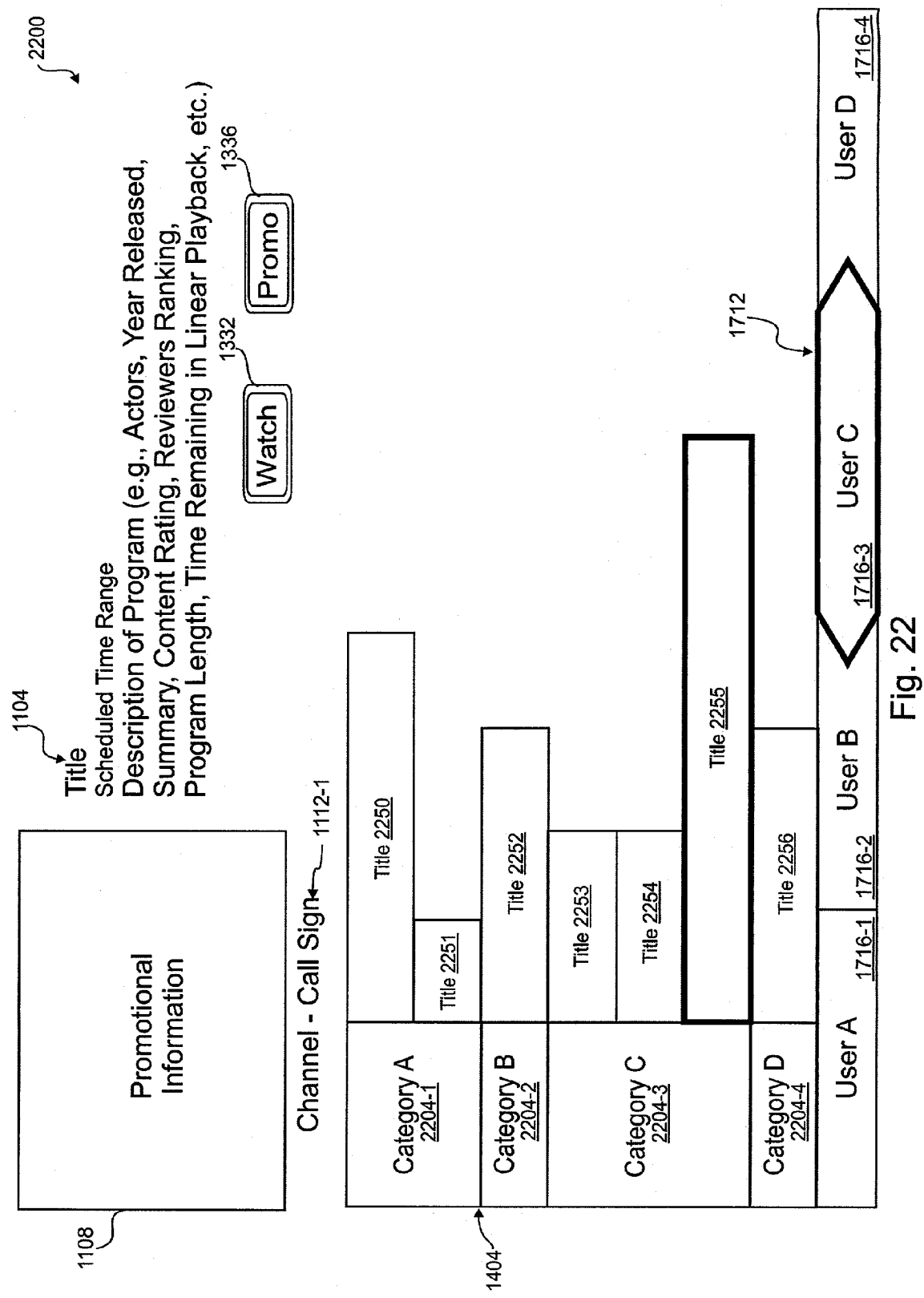
FIG. 22 is a screen shot illustrating an embodiment of a stored program guide where stored programs can be selected for further information.

Referring next to FIG. 22, a screen shot illustrates an embodiment of a stored program guide 2200 where stored programs can be selected for further information. These stored programs displayed in the guide of this embodiment were stored in a digital video recorder (DVR) fashion. The stored programs are grouped in categories 2204, which could be defined by the user or automatically. For example, Category A 2204-1 could be for biographies and have two programs 2250, 2251. Category D 2204-4 could be predefined for a weekly show and the program 2256 in that category could be the current episode. The user could rename the predefined category. User C 1716-3 is believed to be the current viewer, such that the guide 2200 could be customized presuming User C is viewing the guide 2200 currently. Any of the programs of the guide 2200 can be selected for enhanced information in the top half of the guide 2200.

Some embodiments could merge all programs available for immediate playback into a common guide 2200. These programs could be recorded in a DVR fashion or could be SVOD or VOD programs. Preference in the listing could be given to a particular category such as those recorded in a DVR fashion. Other preferences are also possible for sorting this listing, such as the most recently watched, most popular for this user, most recently recorded, favorite genres for this user, etc.

Figure 23:
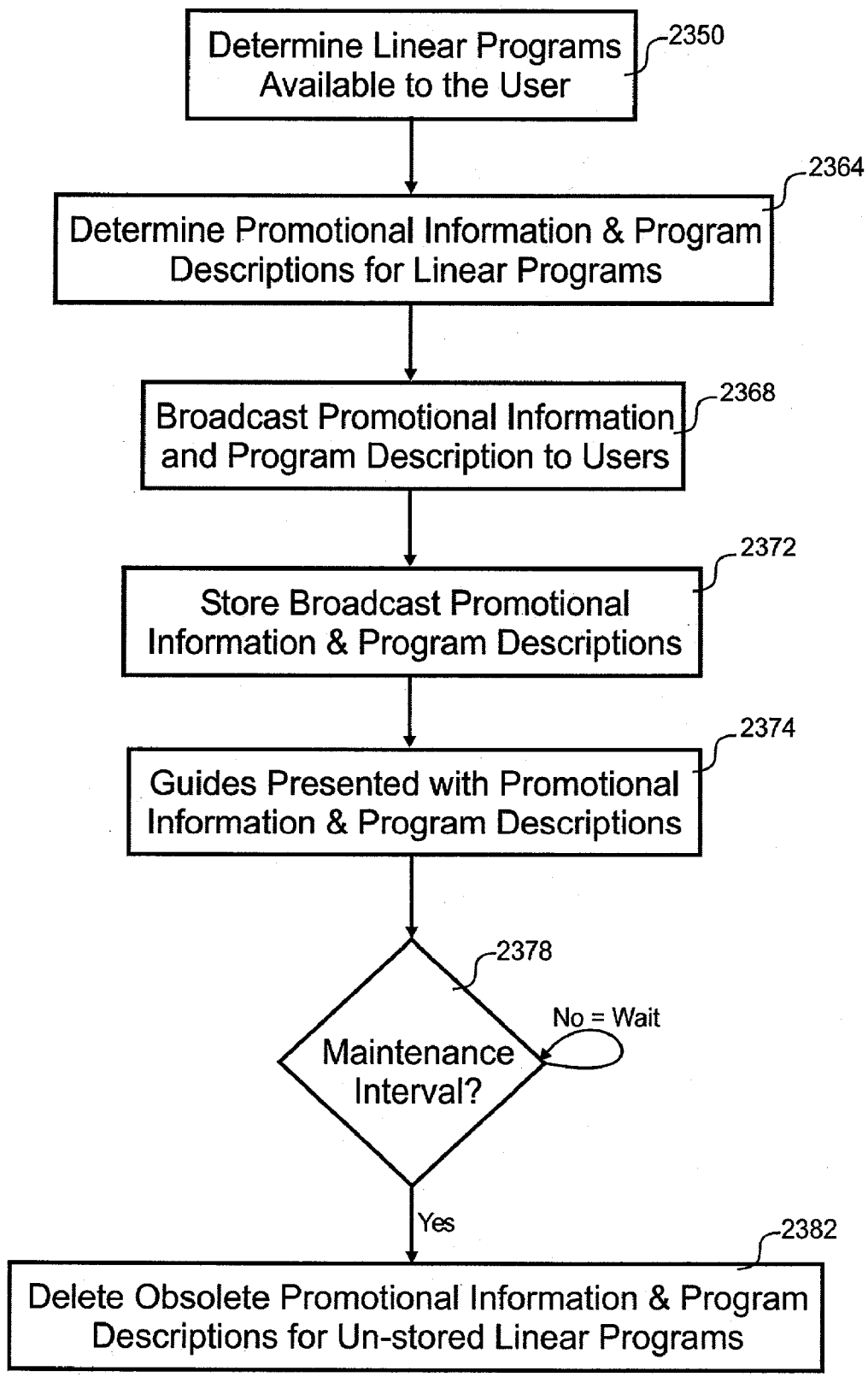
FIG. 23 is a flow diagram that shows an embodiment of a process for distributing promotional information and program descriptions for linearly scheduled programs.

With reference to FIG. 23, a flow diagram that shows an embodiment of a process for distributing promotional information and program descriptions for linearly scheduled programs. The depicted portion of the process begins in step 2350 where the linearly scheduled programs available to the user are determined. A MSO may have large categories of users that see the same linearly scheduled programs with minor variances for premium content providers. Promotional information 1108 and program descriptions 1104 are gathered for those programs in step 2364. The additional content providers or other sources of the programs typically provide this information 140.

In step 2368, the promotional information 1108 and program descriptions 1104 are broadcast to the users. This information may be sent anytime or according to a schedule, such as daily. The set top box 120 receives the promotional information 1108 and program descriptions 1104 and stores it in the local program request database 604. In other embodiments, the promotional information 1108 and program descriptions 1104 may be stored away from the user location, but in a place available to the function formulating the guide screens for the user. For example, a network node in the transmission system 108 may have the promotional information 1108 and program descriptions 1104 available for formulation of any guide that a set top box 120 coupled to the node may request.

In step 2374, the guides can be presented to a user. To formulate detailed information for any linear program in the guide that is selected, the local program request database 604 is queried for the promotional information 1108 and program description 1104 for the selected program(s). Content provider information 1112 is also available in the local program request database 604 for use in formulating the guides. In some cases, the content provider information 1112, the promotional information 1108 and/or the program description 1104 may be missing for a particular program. The missing information could be left blank or filled in with placeholders. For example, a stock image for the genre could be used where the promotional information 1108 is missing for a program, such as a picture of a cowboy hat for a program of the western genre.

Obsolete content provider information 1112, promotional information 1108 and/or program descriptions 1104 are removed from the local program request database 604. In this embodiment, step 2378 waits for a maintenance interval, such as once a day. Once the maintenance interval is expired, processing continues to step 2382 where obsolete content provider information 1112, promotional information 1108 and/or program descriptions 1104 are removed from the local program request database 604. In some cases, promotional information 1108 and/or program descriptions 1104 were provided for a first program that just so happens to have another showing later in the linear schedule or was recorded by the user. Where that program still exists, the promotional information 1108 and/or program descriptions 1104 are maintained, but could be overwritten with updated information if it were received at some later point.

Although this embodiment performs periodic maintenance, other embodiments could obsolete old information in different ways. In one example, the promotional information 1108 and/or program descriptions 1104 are received with expiration dates. Once the expiration has passed, the storage area is available for new information, but could still be used if new information does not overwrite that storage area. Another example may delete the information for a program soon after it plays in the linear schedule.

Figure 24A:
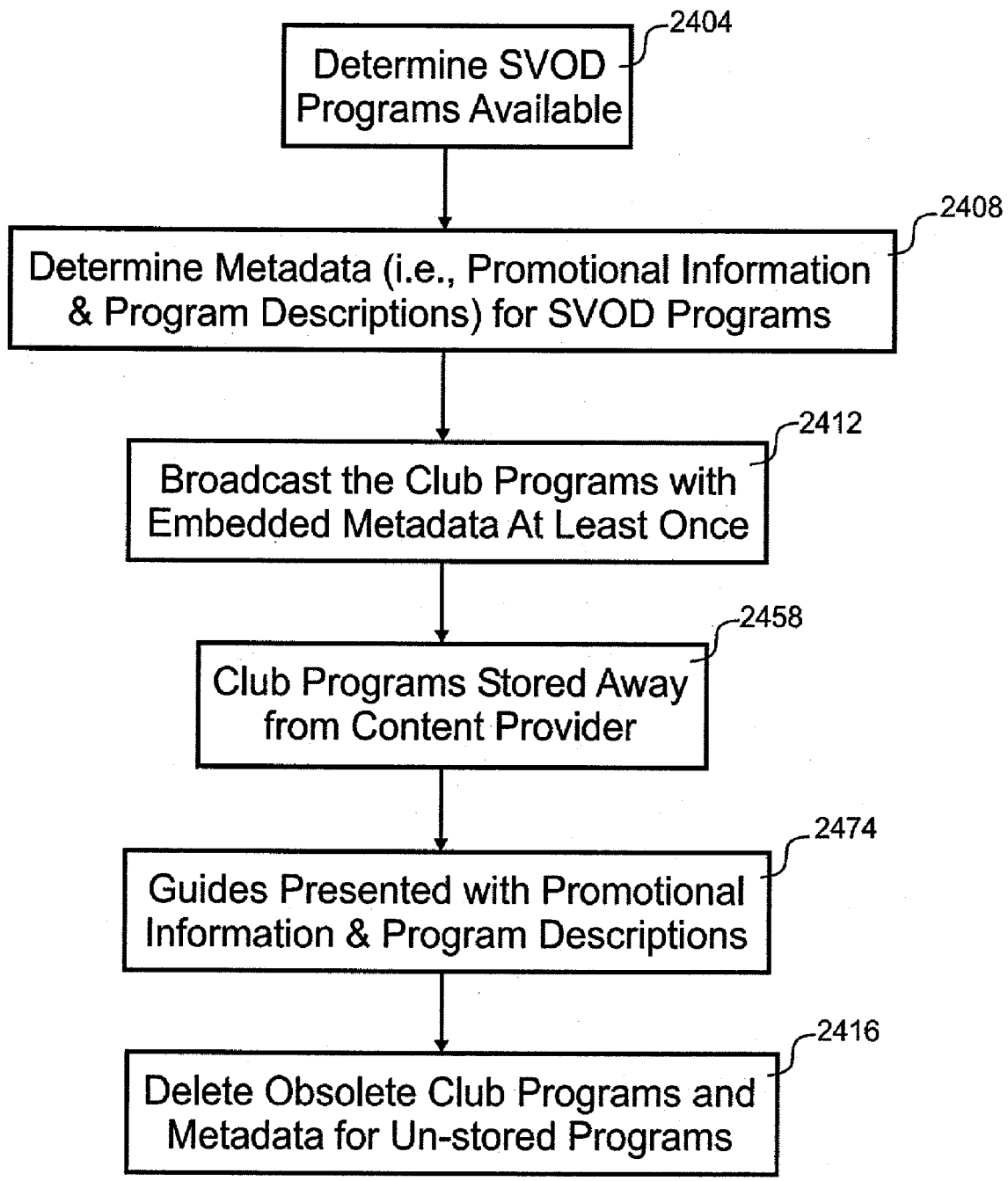
FIG. 24A is a flow diagram that shows an embodiment of a process for distributing promotional information and program descriptions for SVOD programs.

With reference to FIG. 24A, a flow diagram shows an embodiment of a process for distributing promotional information 1108 and/or program descriptions 1104 (i.e., metadata) for SVOD programs. The depicted portion of the process begins in step 2404, where content providers and/or MSO determine the SVOD programs that will be made available to subscribers. The metadata is gathered for the SVOD programs in step 2408. As the club or SVOD programs are distributed, header information contains the metadata in step 2412. A particular SVOD program may be distributed a number of times. Some embodiments could send the metadata with the SVOD program, but not actually embedded within the program.

In step 2458, the club programs are stored in one of a headend, a neighborhood node and/or the user location. The user can browse various guide screens that are populated with the metadata and select programs for viewing. As the programs are deleted in step 2416, the encapsulated metadata is also deleted. In some cases, the SVOD program can be stored by the user past the date that the SVOD program would normally be removed. The metadata in the stored program is available for later use in the guides.

Figure 24B:
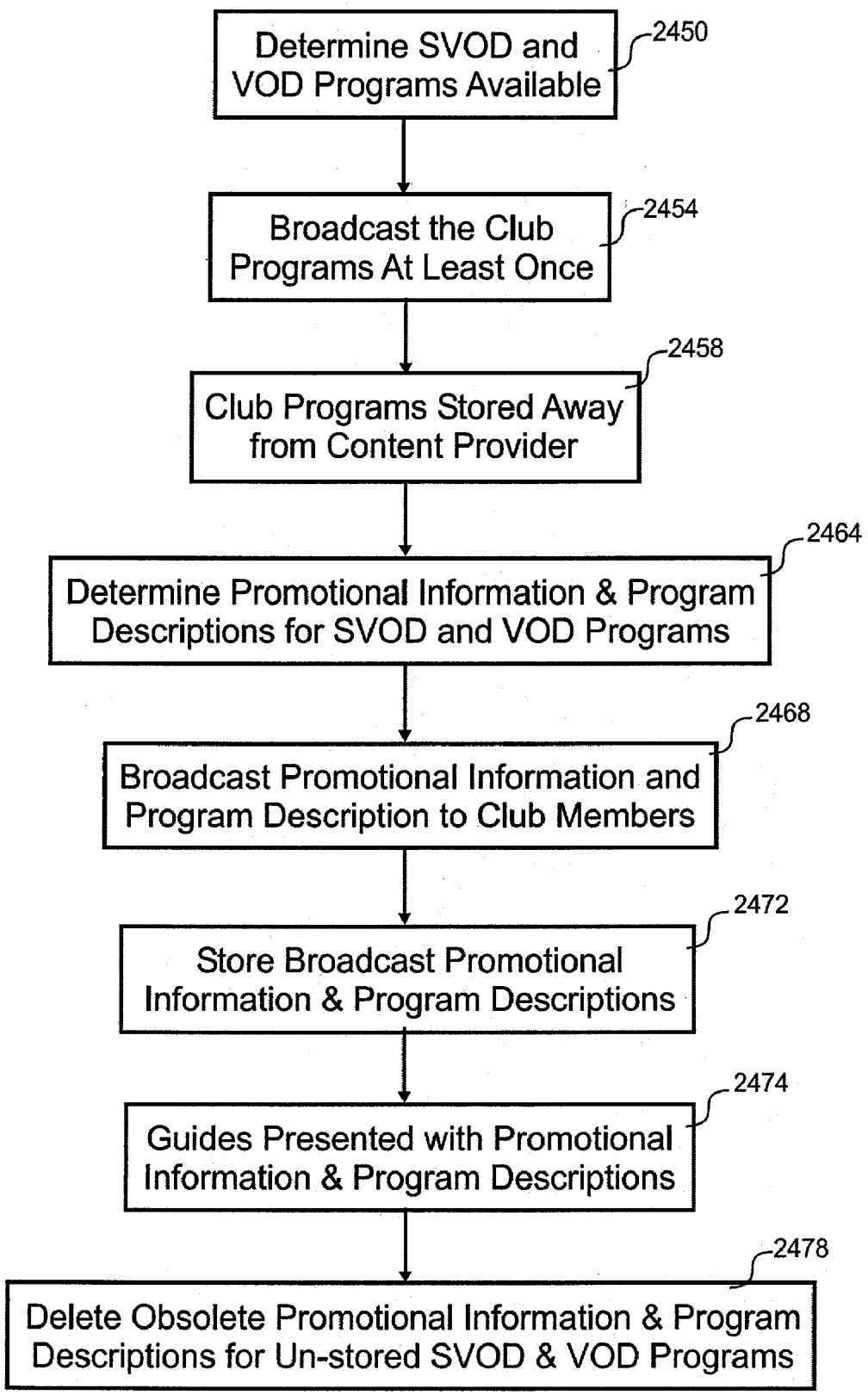
FIG. 24B is a flow diagram that shows another embodiment of a process for distributing promotional information and program descriptions for SVOD and VOD programs.

Referring next to FIG. 24B, a flow diagram shows an embodiment of a process for distributing promotional information 1108 and/or program descriptions 1104 for SVOD and VOD programs. The depicted portion of the process begins in step 2450 where the MSO determines the programs available in one or more SVOD clubs that a user may belong to. Those SVOD programs are at least partially distributed in step 2454 to the club members and/or potential club members. These SVOD programs are stored away from the originating supplemental content providers 140 in step 2458, for example, stored in the headend, the transmission system 108 or in the set top box 120 of a user. In some embodiments, the VOD programs could be also stored for possible viewing by the user.

In step 2464, the promotional information 1108 and program descriptions 1104 are formulated for the SVOD and VOD programs. In some cases, the promotional information 1108 and/or program descriptions 1104 for a particular SVOD selection was already distributed to support the playing of the SVOD program in the linear schedule such that promotional information 1108 and/or program descriptions 1104 are redundant for those programs. The promotional information 1108 and/or program descriptions 1104 for SVOD and VOD programs, that have not already been sent or have information unique from what may have already been sent, are broadcast to the appropriate users in step 2468.

In step 2472, the promotional information 1108 and program descriptions 1104 are stored in the local program request database 604. As it is requested by the user, the guide(s) is presented to the user in step 2474 with the content provider information 1112, promotional information 1108 and/or program descriptions 1104. From the guide, or otherwise, the user can select a club SVOD program for playback. Promotional information 1108 and/or program descriptions 1104 for the VOD and SVOD programs that are no longer available and were not stored by the user, are removed from the local program request database 604. In some embodiments, storage of VOD and SVOD programs may be blocked such that the information can be deleted once the programs are no longer available.

Figure 25:
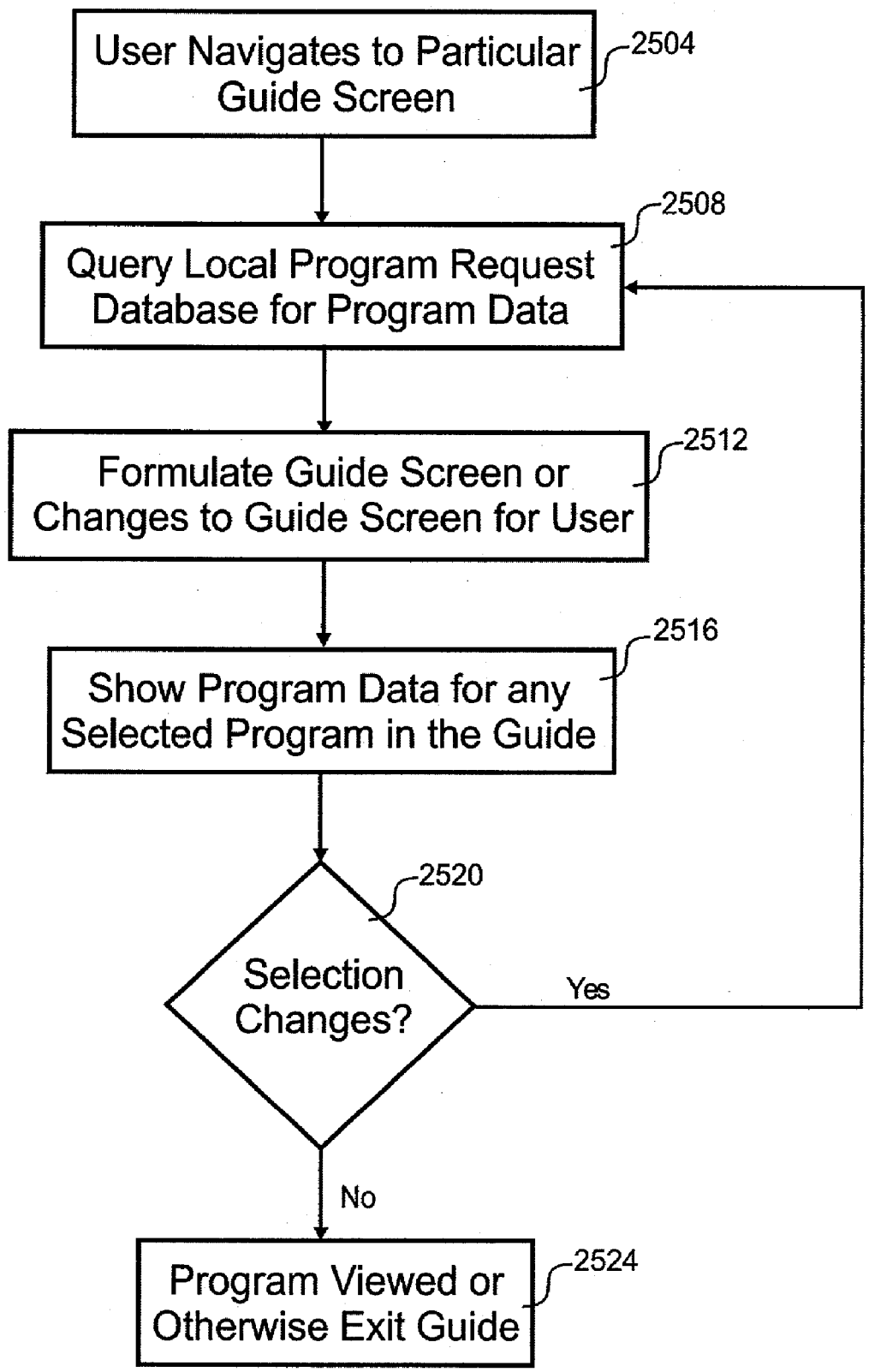
FIG. 25 is a flow diagram that shows an embodiment of a process for formulating guides with content provider information, promotional information and program descriptions.

With reference to FIG. 25, a flow diagram shows an embodiment of a process for formulating guides with content provider information 1112, promotional information 1108 and program descriptions 1104. The depicted portion of the process begins in step 2504 where the user navigates to a particular guide screen 1708. The local program request database 604 is queried for content provider information 1112, promotional information 1108 program descriptions 1104, user preferences, entitled channels and programs, etc. in step 2508. The context of the guide request is determined to formulate a template for the guide screen 1708. For example, the template maybe displaying a linear grid of programs for six channels over a six-hour period with a single program that can be shown in greater detail at one time. In step 2512, the linear program grid is populated with the information from the local program request database, such as title, channel and time. The template itself, its appearance or the programs the template describes can be affected by the user preferences. For example, certain channels of favorite genres could be shown first or the colors for the guide screen 1708 could be customized.

In step 2516, the content provider information 1112, promotional information 1108 and/or program descriptions 1104 are presented for a program in focus for the linear-program grid. This information for the selected program can be retrieved from the local program request database 604 if not already loaded into memory. If the focus or selection changes to a different program in the linear grid, processing loops from step 2520 back to step 2508. Where a user is interested in a program either being detailed or just appearing in the linear program grid, that program can be selected for playback in step 2524 or the user can otherwise exit the guide screen 1708.

Figure 26:
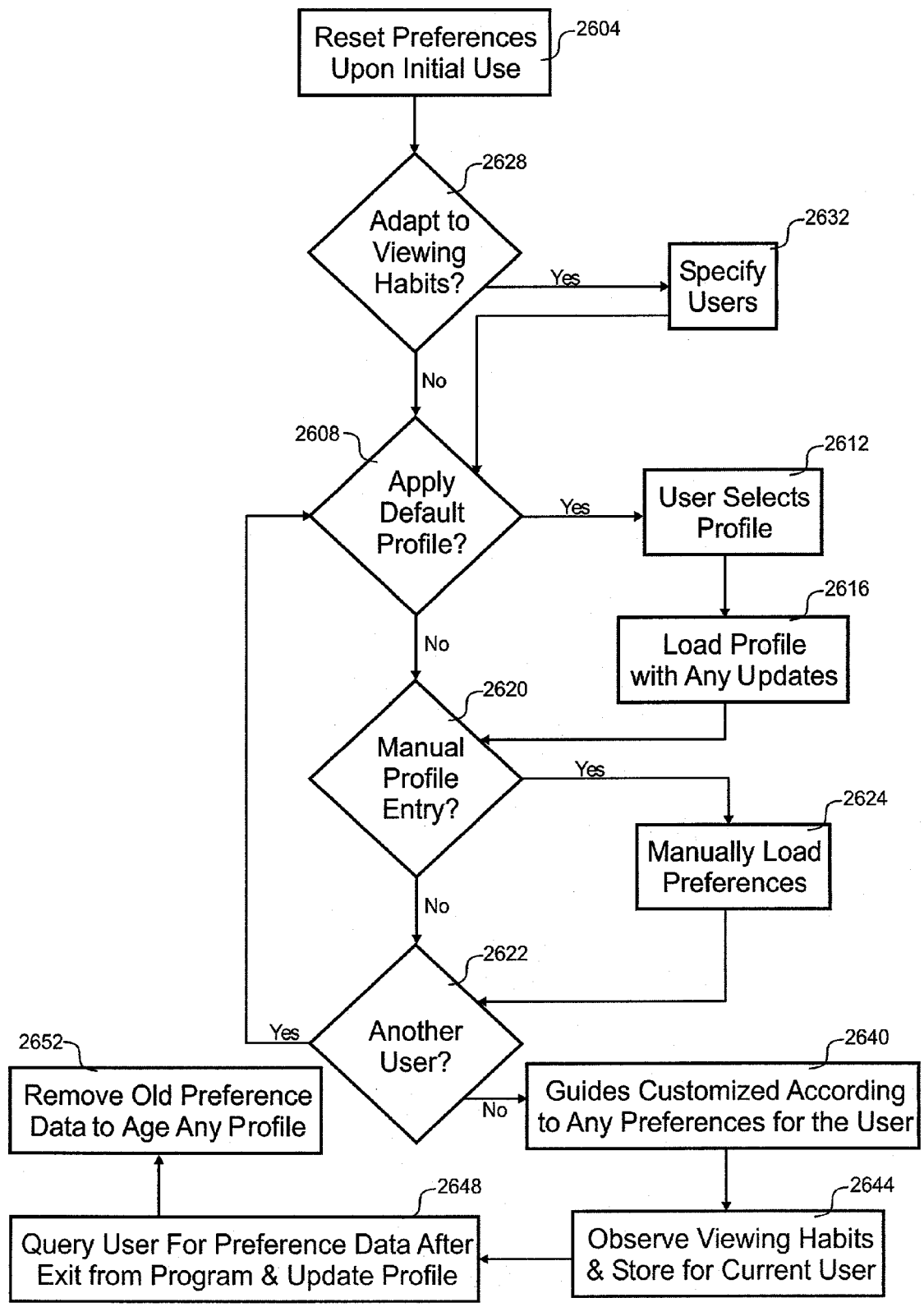
FIG. 26 is a flow diagram illustrating an embodiment of a process for profiling a user.

Referring next to FIG. 26, a flow diagram illustrating an embodiment of a process for profiling a user for customization of the set top box 120 is shown. The depicted portion of the process begins in step 2604 where any preferences set at the factory or a prior owner of the set top box 120 can be reset during the initialization process. In step 2628, a determination is made by the user on whether to allow the viewing habits of the user to affect a profile for the user. In some cases, the profile is reported away from the user location. A privacy policy may be presented to the user for authorization before allowing recording of the user's viewing habits and/or reporting this information away from the user location.

Where the user wishes to have the viewing habits adapt the users profile, processing continues to step 2632 where the users of the set top box 120 are specified. Names can be entered for each user. In step 2608, the user may choose to apply a prepackaged profile or not. The prepackaged profile can be specified even if tracking of the viewing habits is performed. In step 2612, one or more classifications and/or categories can be specified to characterize the user. Some of these classifications and/or categories include various genres, top rated content, content based upon age or other demographic information, content found generally popular by other users, content found popular by other similar users, etc. The top rated content could be according to some category or genre or could be selected by a specified critic or organization, for example, only top rated movies or top rated western shows or only movies approved by the motion pictures rating association to have a "G" rating. Once classifications and/or categories are selected, the are retrieved from the local program request database 604 in step 2616 and added to the user's preferences.

In step 2620, the user can choose to enter more specific profile information. This information can supplement the default profile information or be the only information to initially characterize the user. The specific profile information can augment the profile changes resulting from observing of the viewing habits of the user. The manually entered information can be search terms, favorite shows, channels, and/or a time period to record programs on a specified channel. Also, the manually entered information can include negative terms such as excluding programs containing a search term, actor, genre, channel, and/or time period for a specified channel. For example, the user can specify recording everything on channel ten between eight and ten at night or could prevent recording of any program with John Doe as an actor.

This embodiment allows defining preference information for each user in a serial fashion, although other embodiments could allow specification of the preference information for each user at each of the above steps. Where there is another user, in step 2622, processing loops back to step 2608 to allow entry of preference information for another user. Any number of users can have their viewing habits influence their profile, apply a default profile, and enter manual profile information.

Once all users are configured, the guides are customized in step 2640 according to preferences that are either entered by the user or derived from the user's viewing habits.

Customization can be based upon an aggregate profile for all users (i.e., where only one user is specified) or can be a user-specific profile for that user. Automatically determining the user with confirmation assists in this customization. If the determined user is wrong, the actual user can override the automatic determination. In step 2644, the viewing habits for the current user are determined and the profile is updated for that user. After viewing any program, the user can be queried to determine if the program was liked in step 2648. This query could be along a sliding scale such as one to five for a program. The user can also indicate which actors were liked, if the genre was liked, if the director or musical score was liked, etc. The answers to these questions influence the profile of the user. In step 2652, older viewing habits, preference data and/or survey questions can be aged for deletion after a period of time. For example, information more than a quarter-year old could be deleted or older information could be deleted after the viewing habit data reaches a certain size.

Figure 27:
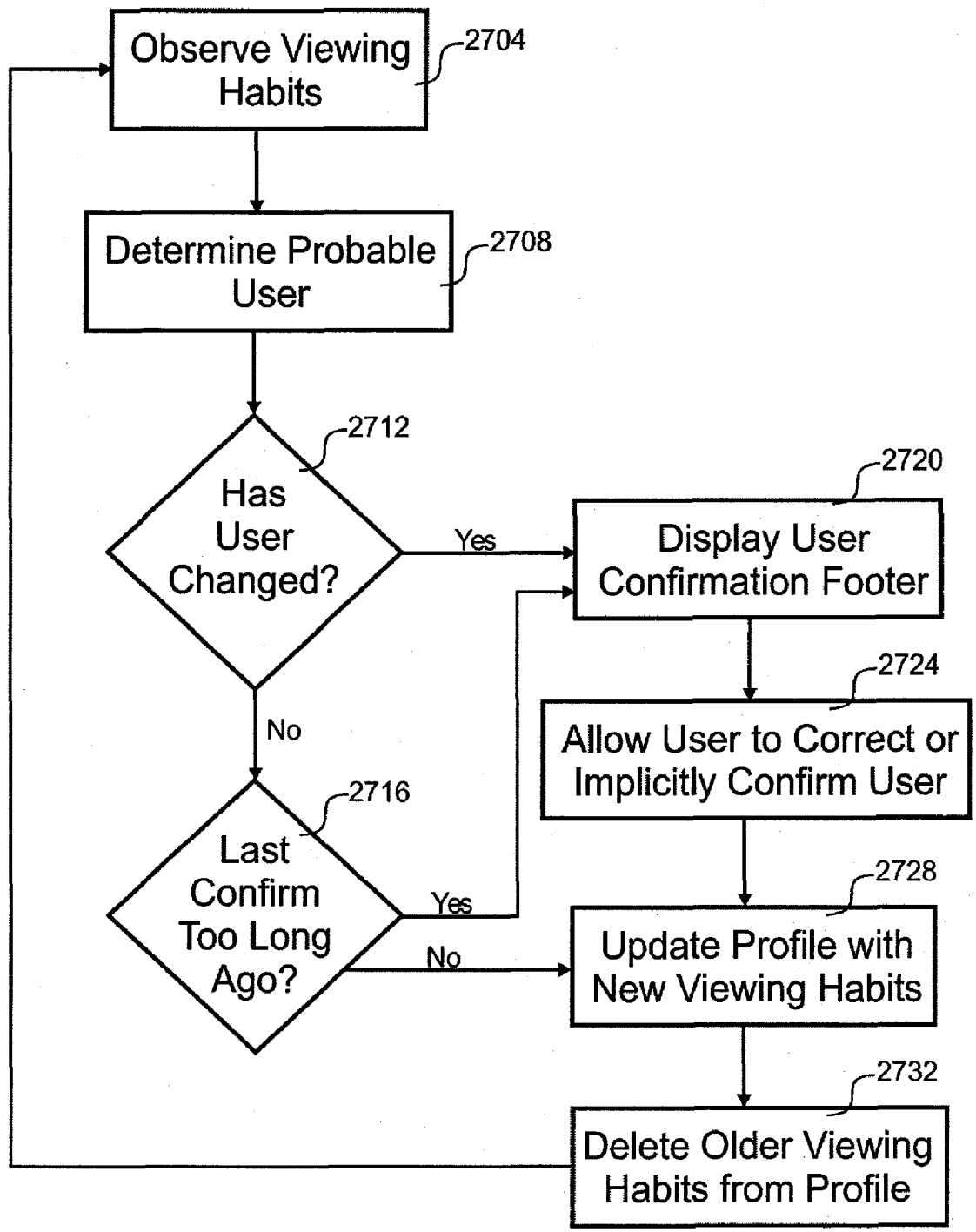
FIG. 27 is a flow diagram illustrating an embodiment of a process for determining and confirming the user currently using the set top box.

With reference to FIG. 27, a flow diagram illustrating an embodiment of a process for determining and confirming the user currently using the set top box 120 is shown. Where there are multiple users of a set top box 120, identifying the user allows gathering viewing habits for each user separately and presenting guide screens customized for the current user. The depicted portion of the process begins in step 2704 where the set top box 120 observes the viewing habits of the current user. Things such as the programs viewed, the duration of viewing each channel, the timing of interaction with the remote control buttons, time of day, etc. are used to determine the probable identity of the current user in step 2708. Other embodiments could use other biometric techniques.

In step 2712, the set top box 120 determines if the current user has changed. Where the user is believed by the set top box 120 to be a different user, a user confirmation footer 1712 is displayed in step 2720. The current user can correct the determined current user in the confirmation footer 1712. A correction will adjust the profile for the current user in step 2728 to allow more accurately recognizing that user in the future. In step 2732, the older viewing habits are removed from a user's profile to update a running sample of viewing habits. Some embodiments could also age preference information entered by the user and remove the older preference information along with the older viewing habits.

Where the set top box 120 does not believe user has not changed back in step 2712, and a user has not been confirmed recently as determined in step 2716, processing loops back to step 2720 for display of a user confirmation footer 1712. Where the user has confirmed their identity recently, processing continues to step 2728. For example, the user confirmation footer 1712 could be displayed if the user has not confirmed their identity this week. Other embodiments could use other time periods. The time period could be measured with a calendar or could be measured in hours of interaction by the user with the set top box 120.

Figure 28A:
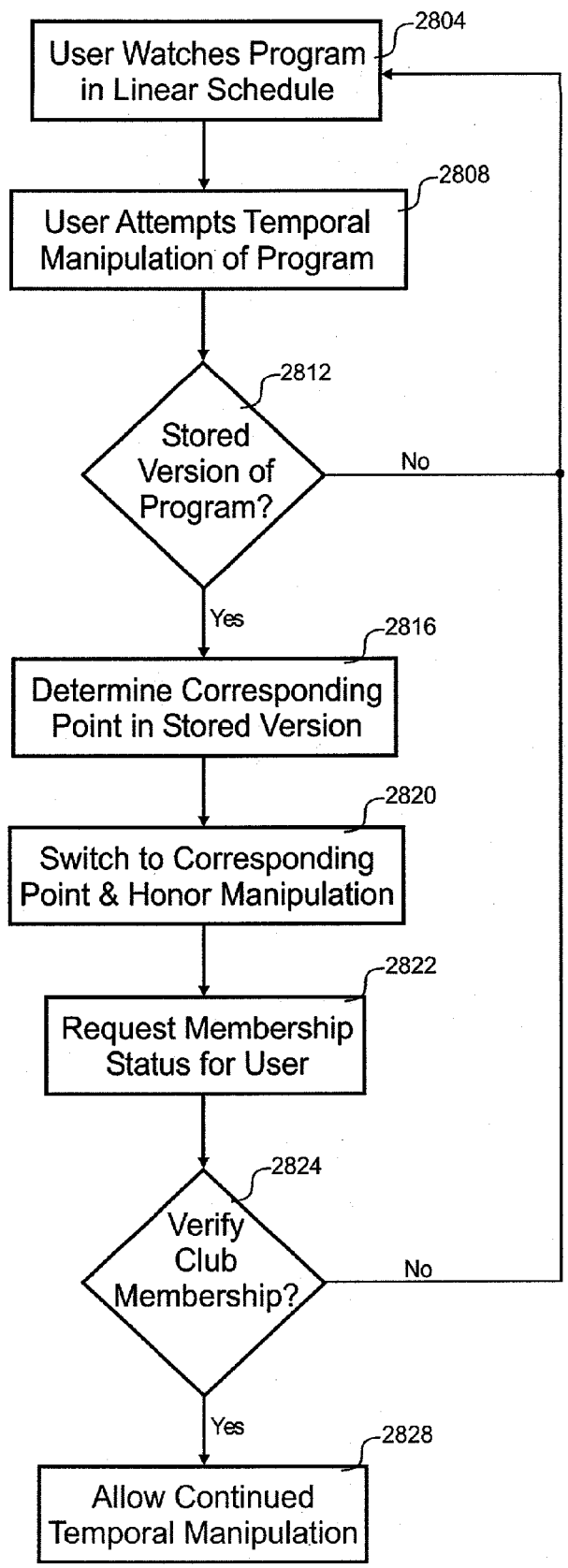
FIG. 28A is a flow diagram of an embodiment of a process for verifying authorized manipulation of playback.

With reference to FIG. 28A, an embodiment of a process validating a user is a club member is shown. In this embodiment, a user viewing a program in the linear schedule is allowed to view any stored version of a program before validation that the user is a club member. If membership cannot be validated, the user is switched back to the version of the program in the linear schedule. The validation process can take a fraction of a second or several seconds depending on network congestion and latency.

The depicted portion of the process begins in step 2804 where the user is watching a program in the linear schedule of programs. In step 2808, the user attempts temporal manipulation of the program, for example, pause, stop, fast-forward, rewind, or skip forward/reverse a predetermined period. A determination in step 2812 is made as to whether the portion of the program being viewed has a corresponding portion stored at the headend, user location, network node or elsewhere. If there is no stored version available, nothing further is done and the user continues watching the linearly scheduled program. Some embodiments may display a message indicating that temporal manipulation is not possible.

Where a stored version is available of the linearly scheduled program, processing continues to step 2816, where the point of the linear program being viewed is determined for the stored version. The equivalent point in the stored version can be determined by analyzing time stamps, for example. In step 2820, the portion of the linear program being viewed is switched for the stored version seamlessly or with a minimum of distortion. The temporal manipulation requested is also performed in this step. For example, the stored version would be displayed in paused fashion if the user requested the program be paused. If the temporal manipulation were a pause, the linearly scheduled program could provide the paused frame while the stored version is prepared for switchover and further temporal manipulation.

In step 2822, a query is performed to determine if the user is a member of the club. In this embodiment, the query is made to a billing system that is located away from the user location, although some embodiments could query the local program request database 604 where a store and forward methodology is used. Other embodiments could perform the request of step 2822 at any time after step 2808. The playback will switch to the stored version as soon as possible and without waiting for verifying club membership. If club membership is not verified in step 2824, the user is switched back to watching the program from the linear schedule by looping back to step 2804. If the club membership is confirmed in step 2828, the user can continue to temporally manipulate the stored version of the program. In this embodiment, the delay in verification does not extend the interruption associated with switching from the program in the linear schedule to the stored version of that program.

Figure 28B:
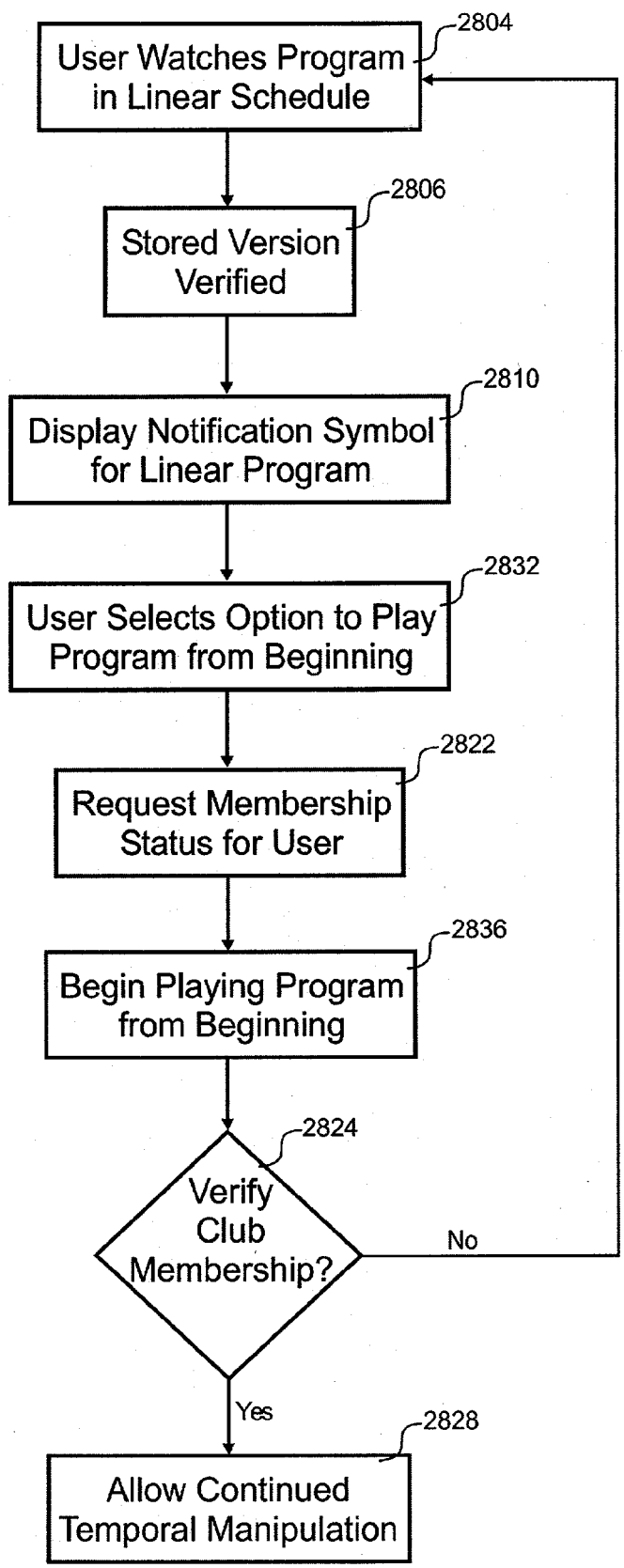
FIG. 28B is a flow diagram of another embodiment of a process for verifying authorized playback from the beginning of the program.

Referring next to FIG. 28B, a flow diagram of another embodiment of a process for verifying authorized playback from the beginning of the program is shown. When the user is viewing a program in the linear schedule in step 2804, a notification symbol is displayed to indicate that the program is generally available for temporal manipulation in step 2810. This embodiment verifies that the program is available on the server or DVR in step 2806 before displaying the notification symbol. Other embodiments could simply display the notification symbol and presume the program is available on the server. One possible manipulation is to play the program from the beginning. It may be that the user has just switched to the channel and thinks the program is interesting in step 2804. In this scenario, the user may wish to start viewing from the beginning and selects the option associated with playing from the beginning in step 2832. The option could be activated by a button on the remote, such as a skip to the beginning of the track button, or by selecting the notification symbol which could display a menu with the option.

Where the user selects the option to play the program from the beginning in step 2832, a request is made to determine the membership status of the user in step 2822. Without waiting for an answer, the program begins to play in step 2836. After that point the membership is verified in step 2824 to allow continued playback from the beginning in step 2828. Other embodiments could exchange steps 2822 and 2836 such that playback is performed before requesting the membership status for the user. In addition to starting playback from the beginning, other temporal manipulation is possible such as pause, fast-forward, rewind, stop, skip to the beginning, skip to the closing credits, skip to the previous chapter, skip to the next chapter, go to a program menu, skip forward a first predetermined number of seconds, skip back a second predetermined number of seconds, etc. Further, all the other embodiments could present the notification symbol of step 2810 when temporal manipulation is possible such that the user knows when it is possible to attempt manipulation.

Figure 28C:
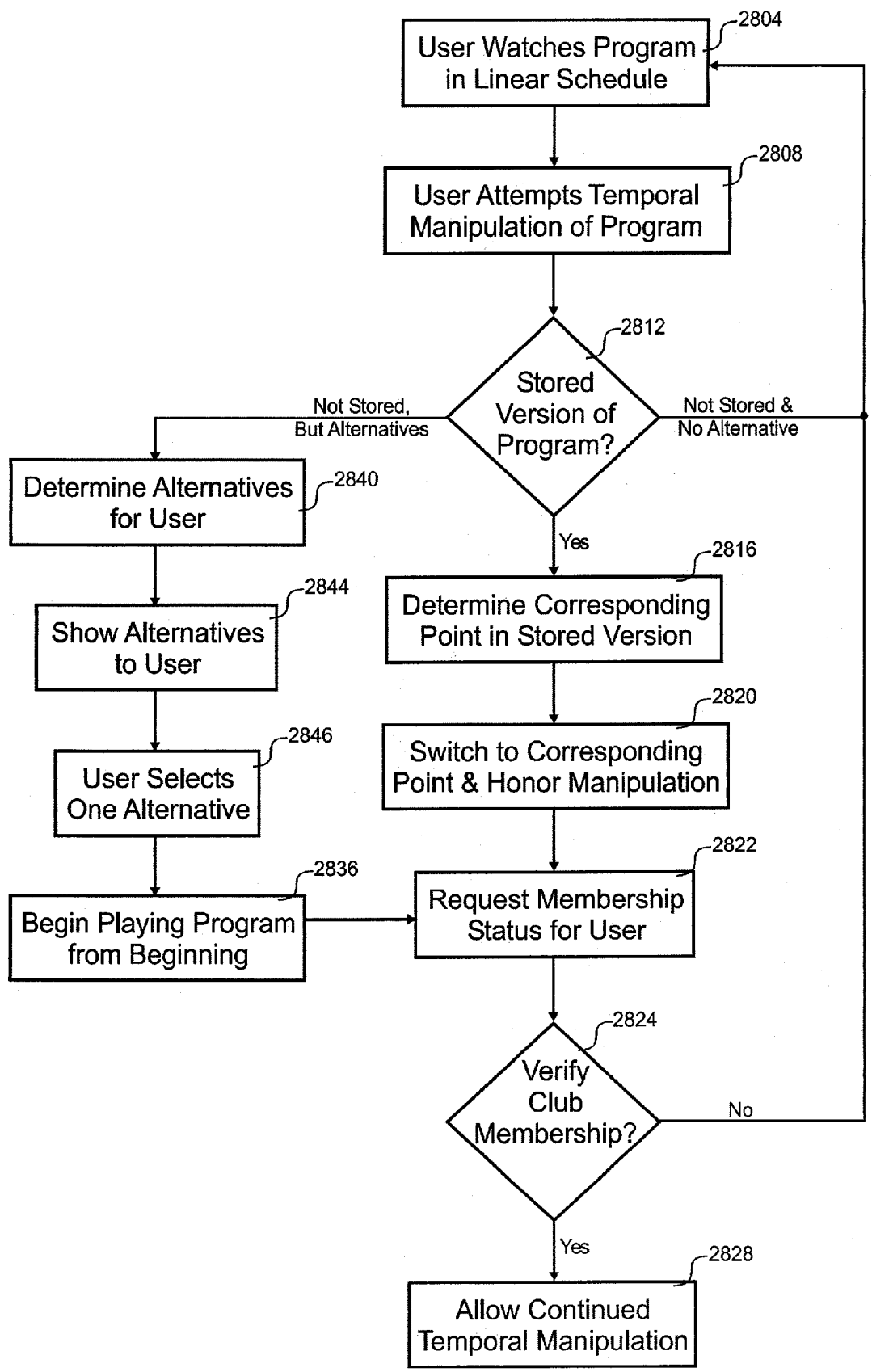
FIG. 28C is a flow diagram of yet another embodiment of a process for verifying authorized playback of a program where alternatives may be suggested.

With reference to FIG. 28C, a flow diagram of yet another embodiment of a process for verifying authorized playback of a program is shown where alternative programs may be suggested where the first choice is not available. In this embodiment, suggestions are made when there is no stored version. Some embodiments could suggest alternatives when it is determined club membership is not authorized. The alternatives could be free programs or programs associated with other clubs or programs that the user may be authorized for.

This embodiment is largely the same as the embodiment of FIG. 28A except that a new processing branch is provided off step 2812 that is used when there is no stored version of the program, but alternatives programs are available. In step 2840, the alternative programs are determined for the user. The alternatives may be determined for groups of users or customized for each user. The alternatives may be influenced by one or more of the following factors: this user's stated preferences, the user's viewing habits, the stated preferences for the set top box or account regardless of viewer, the viewing pattern for the set top box or account, the authorizations for the user location, which programs have already been viewed, promotions offered by the content providers, time of day, season, etc.

In step 2844, the alternatives are presented to the user with a menu. The alternatives can be navigated to and selected in step 2846. After selection, the alternative program begins to play from the beginning in step 2836. In step 2822, the membership status is requested for the user. After this point, the processing is the same as in the previous figure. Some embodiments could cull the list of alternatives to those that are authorized such that processing could go strait to step 2828 without requiring a check of membership.

Figure 28D:
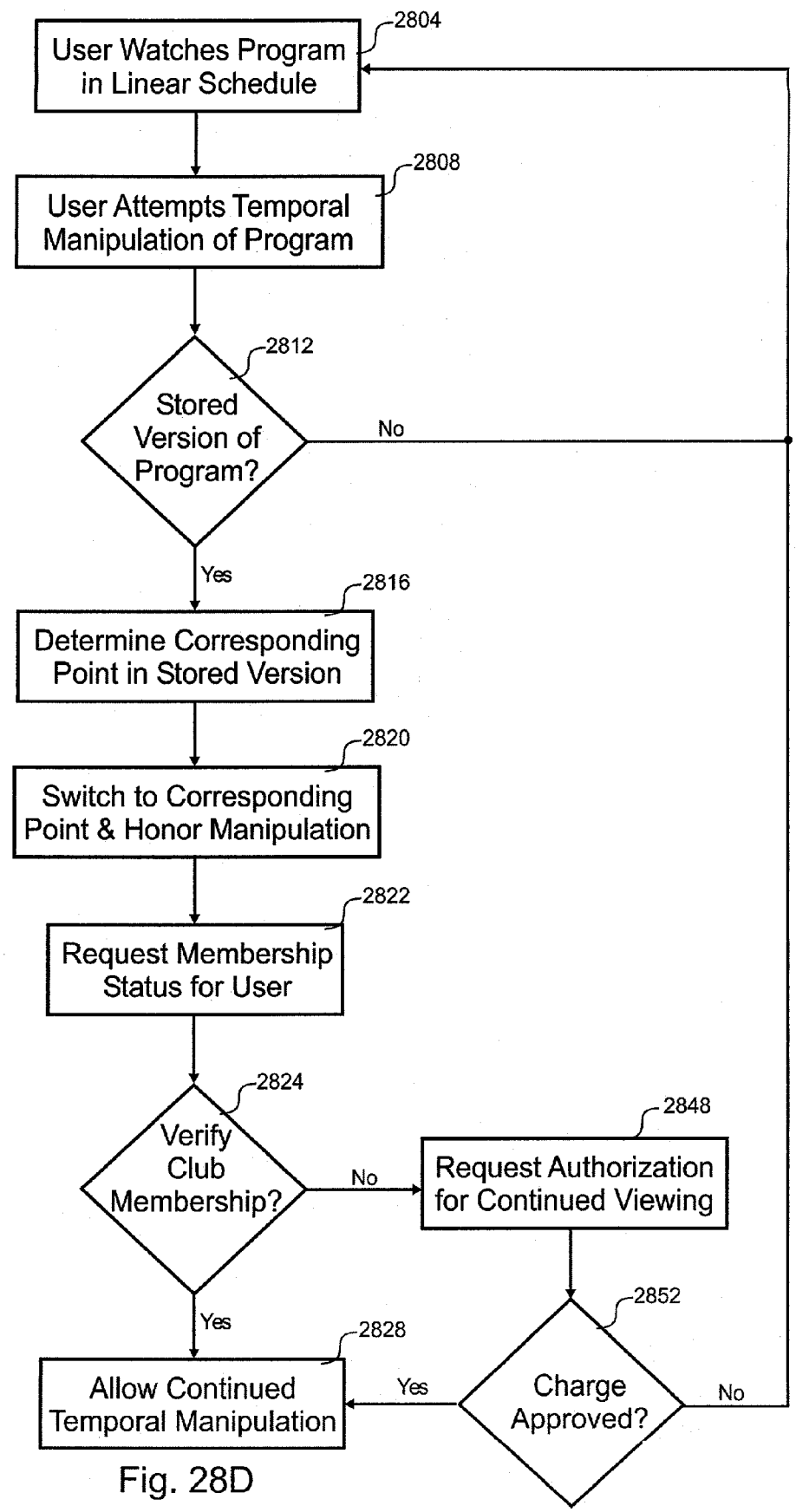
FIG. 28D is a flow diagram of still another embodiment of a process for verifying authorized playback of a program where the user can upgrade to the club to continue viewing.

Referring next to FIG. 28D, a flow diagram of still another embodiment of a process for verifying authorized playback of a program is shown where the user can upgrade to the club or purchase a view to continue playback of the program. This embodiment is similar to the embodiment of FIG. 28A, except the user is given the option to continue viewing the program where club membership is not verified in step 2824. This option is presented in step 2848 where authorization is requested to either join the club and/or pay for the single program. The user may have to enter payment and/or other information to facilitate the sale. If the user approves the charge in step 2852, processing continues to step 2828 where continued viewing and manipulation is allowed. Where the charge is not approved in step 2852, the user is returned to the linear program in step 2804. Although this embodiment charges monetary consideration before authorizing the viewing of the program, other embodiments could seek other consideration before authorizing the viewing of the program. For example, the user may have to agree to receive advertising, to provide personal information, to fill out surveys, or other non-monetary consideration before viewing is allowed.

Figure 28E:
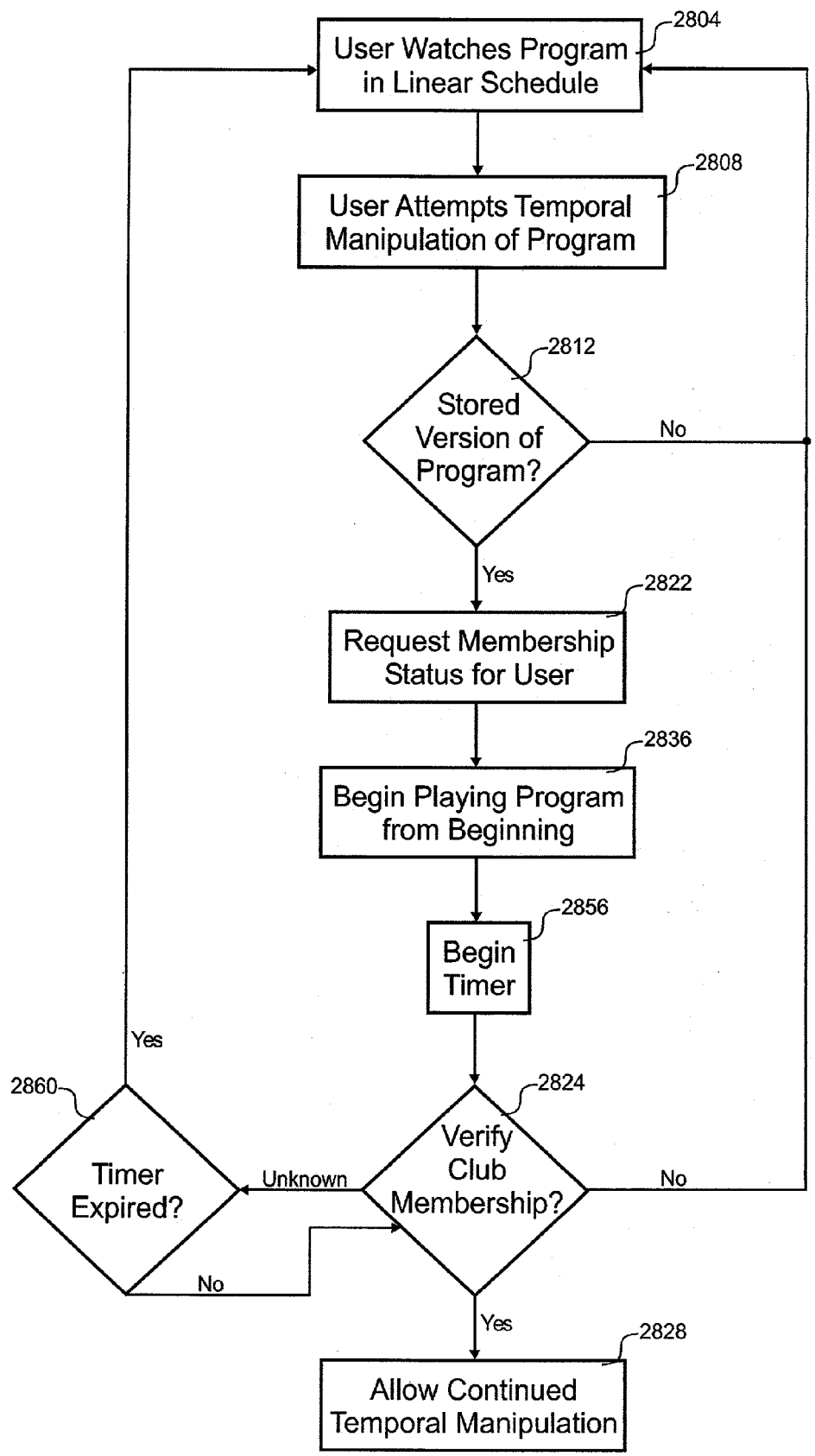
FIG. 28E is a flow diagram of one embodiment of a process for verifying authorized playback where a timer is used to prevent excessive viewing before authorization.

With reference to FIG. 28E, a flow diagram of one embodiment of a process for verifying authorized playback is shown where a timer is used to prevent excessive viewing before authorization is verified. This embodiment is similar to that of FIG. 28B, but a timer is used to limit the time allowed to obtain verification of authorization. From step 2836, a new step 2856 is added that starts a timer. The period for the timer can be influenced by one or more of the following factors: marketing rules, authorization speed of the user's configuration, size of the program, likelihood that the user is authorized, contract requirements from the copyright owner, the time believed to best encourage the user to purchase a club membership, etc.

In step 2824, the club membership is verified. Where the billing system has not provided an answer yet, processing goes to step 2860. A determination of whether the timer has expired is made in step 2860. Where the timer has not expired, processing continues back to step 2824 for further waiting to verify club membership status. Where the timer has expired as determined in step 2860, processing loops back to step 2804 where the user returns to the program playing in the linear schedule. This embodiment would prevent a user from disabling the membership request in an effort to extend the view time before club membership is verified.

The embodiments of FIGS. 28A-28E have various features that can be mixed, removed and/or combined to form new embodiments. For example, a single embodiment may allow playback from the beginning shown in FIG. 28B, alternative suggestions to be presented to the user as shown in FIG. 28C, a solicit membership or purchase of a view as shown in FIG. 28D, and/or limit the time allowed to verify club membership as shown in FIG. 28E. Various implementations may mix and match these features and still remain in the scope of this invention.

Figure 29A:
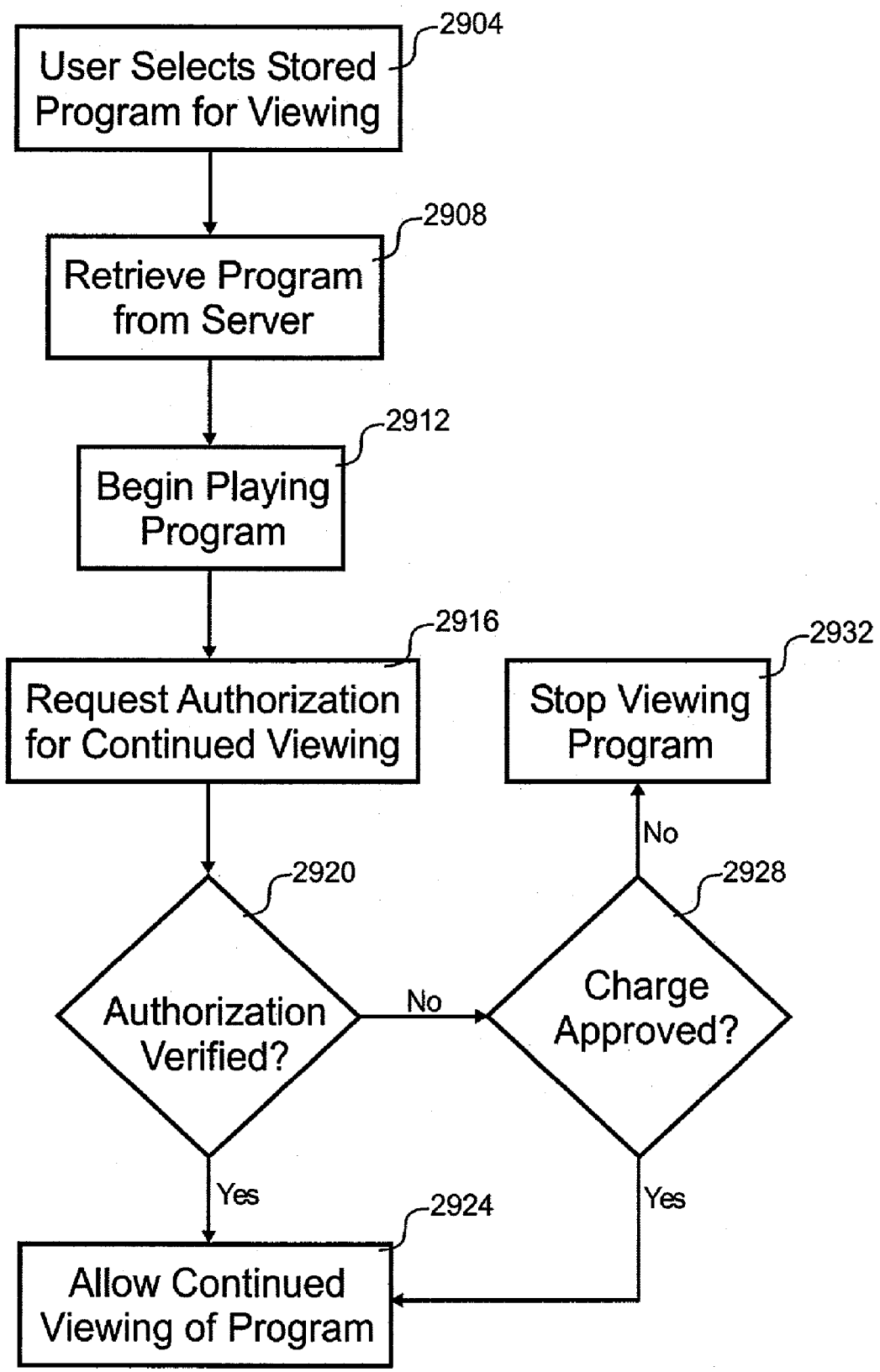
FIG. 29A is a flow diagram of an embodiment of a process for verifying authorized playback of a stored program.

With reference to FIG. 29A, a flow diagram of an embodiment of a process for verifying authorized playback of a stored program is shown. This embodiment is applicable to situations where a program is stored local to the user location, in a neighborhood node, in the headend or elsewhere in the system. The user has the ability to request viewing of any stored program and chooses one in step 2904. The program is spooled or otherwise received in step 2908 from the server. In various embodiments, the program could be delivered with MPEG-2 transport, packet switched protocols, or circuit switched transport. Once the portion requested by the user is received, the playback can begin. The start of playback is not impeded by the latency associated with determining if the user is authorized to view the program such that the program begins play in step 2912.

In step 2916, authorization is requested for continued viewing of the program. Other embodiments could perform step 2916 at any point after step 2904, but playback is not conditioned upon an answer to the authorization request. In step 2920, the authorization could be verified by querying a database away from the user location in the headend, a node or elsewhere. In some embodiments, the authorization could be stored in a database local to the user location. Where authorization is verified, continued viewing is allowed in step 2924. Some embodiments may have a timer that allows viewing for up to ten seconds before preventing further viewing where the authorization request is not responded to in that period.

Where authorization cannot be verified in this embodiment, processing continues to step 2928 where the user is asked to authorize a charge for the program or asked to join a membership club that would allow viewing of one or more programs. Where the user approves the continued viewing, processing continues to step 2924 where that viewing is allowed to occur. If the charge or club membership is not approved, further viewing of the program is prevented in this embodiment. The status of the authorization may be retained in the set top box to prevent any further viewing of the program. Although the above embodiment uses video programs, other embodiments could use audio programs delivered through satellite, VDSL or a cable TV plant. Other embodiments could deliver video games to the set top box 120 in this manner also.

Figure 29B:
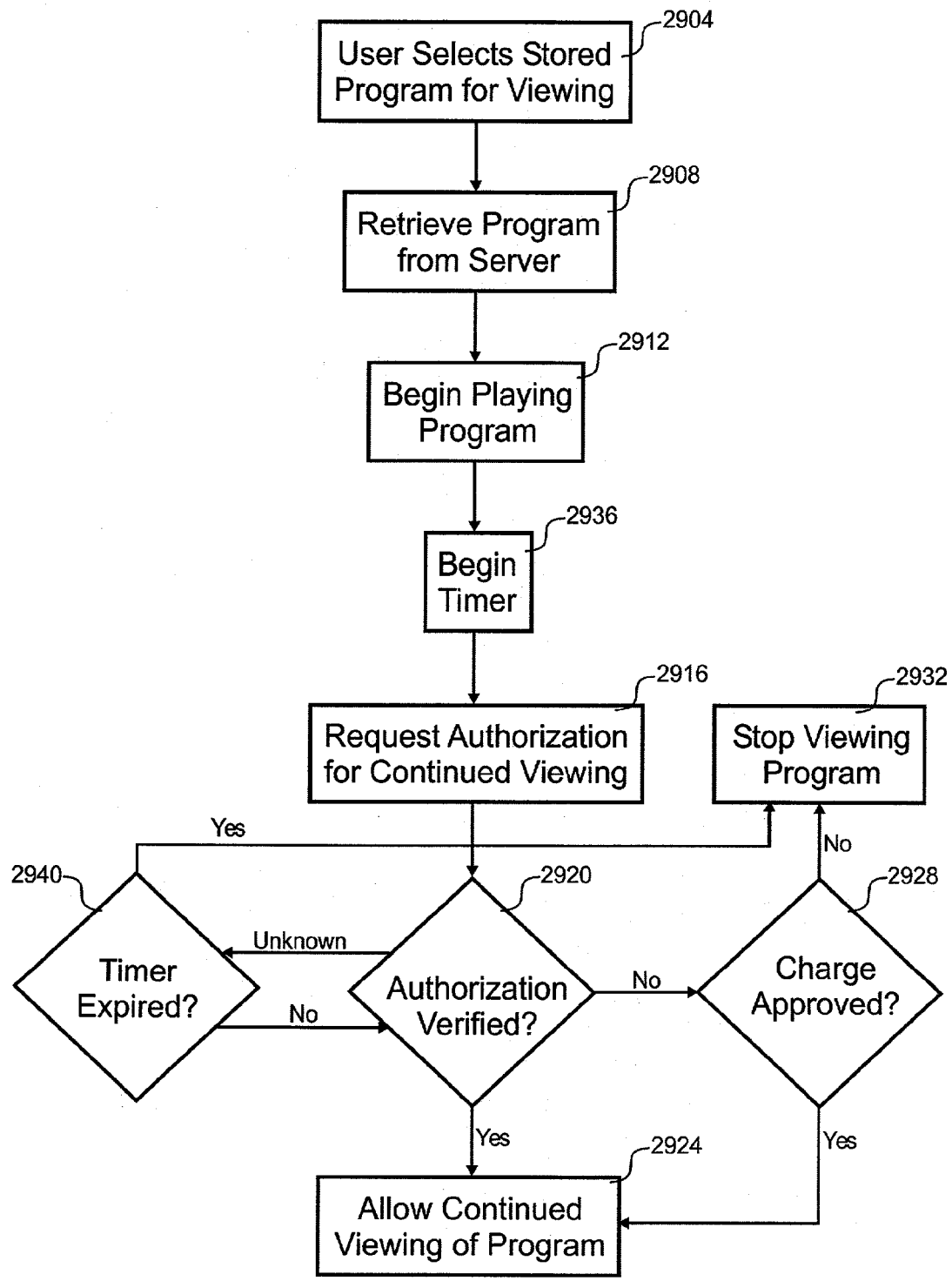
FIG. 29B is a flow diagram of another embodiment of a process for verifying authorized playback of a stored program where a timer is used to prevent excessive viewing before authorization.

Referring next to FIG. 29B, a flow diagram of one embodiment of a process for verifying authorized playback of a stored program is shown where a timer is used to prevent excessive viewing while waiting for a response on authorization. Two new steps 2936 and 2940 are added to the embodiment of FIG. 29A to enable this additional functionality. In step 2936, a timer is started. Similar to the timer of step 2856 in FIG. 28E discussed above, there can be many factors that influence the period of the timer. Authorization for continued viewing is performed in step 2916. While waiting for continued viewing to be authorized in step 2920, the timer may expire in step 2940, which causes viewing of the program to cease in step 2932.

Figure 29C:
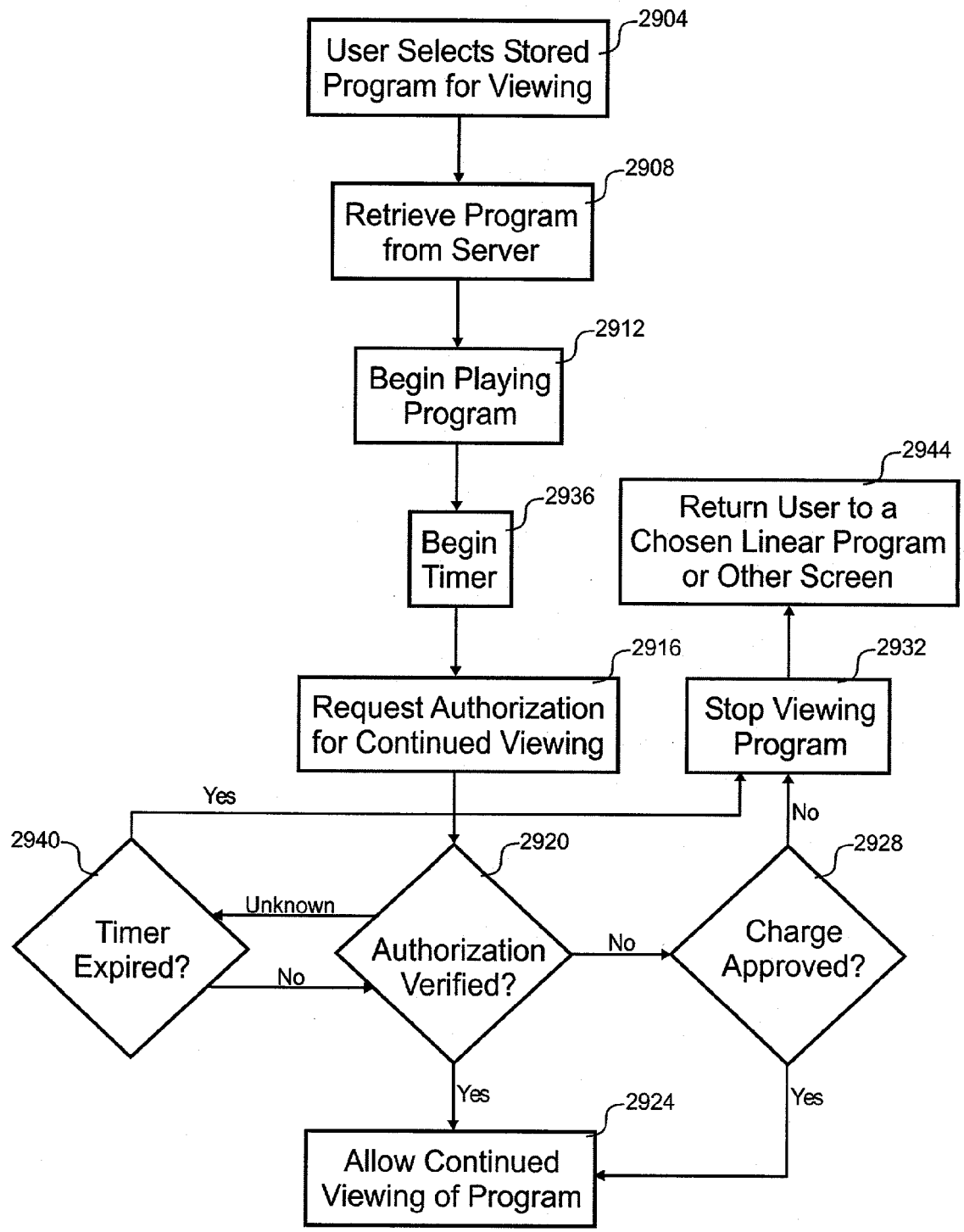
FIG. 29C is a flow diagram of another embodiment of a process for verifying authorized playback of a stored program that leaves unauthorized users viewing a chosen program in the linear schedule.

With reference to FIG. 29C, a flow diagram of another embodiment of a process for verifying authorized playback of a stored program is shown that leaves unauthorized users viewing a chosen program in the linear schedule or some other predetermined screen. This embodiment is similar to the embodiment of FIG. 29B, but for the additional step 2944 where the user is returned to a linear program or screen. For example, the user may be redirected to the current club offering in the linear schedule where the user tried to watch a program in the club that wasn't authorized. In another example, the user could be redirected to a menu for purchasing single views or an advertisement for some other goods and/or service. The suggested alternative programs or categories of programs could be customized according to the profile of the current user. Examples of the screens presented are explained in relation to FIGS. 19, 20 and 21. This embodiment creates an opportunity to further interact with the user before they divert their attention to other programs perhaps associated with a different content provider.

Although this embodiment suggests alternatives or other advertisements when authorization is denied, other embodiments could trigger this advertisement at other times. For example, advertisement could appear when the program is stopped or paused, when there is any delay in performing a function, when the input signal is unavailable, etc. These advertisements could attempt to up-sale the user to other products offered by the content provider or could provide advertisements that are not associated with the content provider.

Figure 29D:
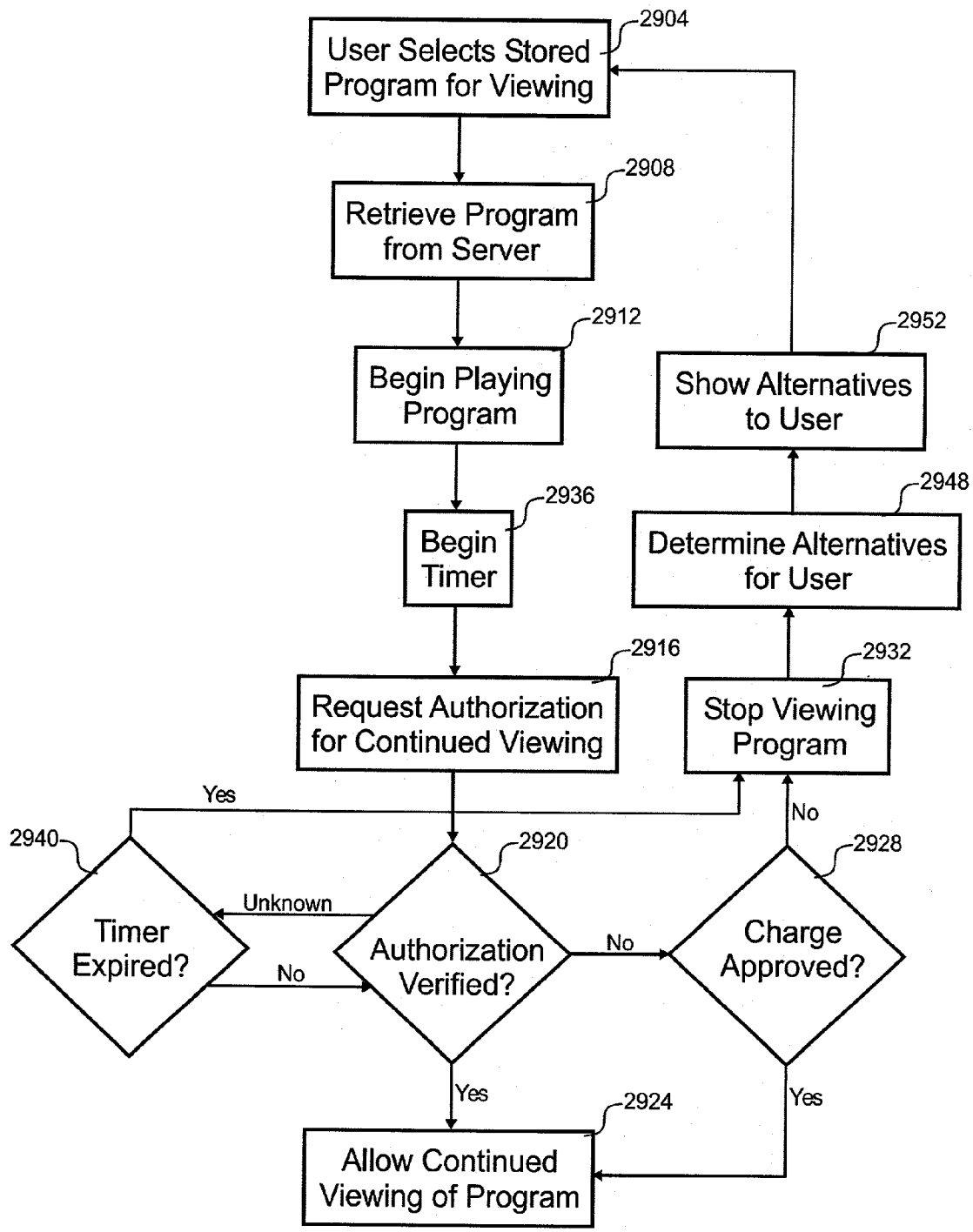
FIG. 29D is a flow diagram of yet another embodiment of a process for verifying authorized playback of a stored program where alternatives may be suggested.

Referring next to FIG. 29D, a flow diagram of yet another embodiment of a process for verifying authorized playback of a stored program is shown where alternatives may be suggested. This embodiment is similar to that of FIG. 29B, but additional steps 2948 and 2952 are added after step 2932 to suggest alternative programs. In step 2948, the alternatives are determined for the user in a manner similar to that discussed above in relation to FIG. 28C above. The alternatives could be individual programs associated with the same content provider or not or could be categories of programs associated with the same content provider or not. Further the alternatives could be customized by the profile of the current user. In step 2952, those alternatives are shown to the user for possible selection. By looping back to step 2904, the user can select one of the suggestions to begin the process again. In another embodiment, the suggested programs that are known to be not authorized from step 2920 could be removed from the list. Some of the remaining suggestions could be members of different clubs and require further authorization.

Figure 29E:
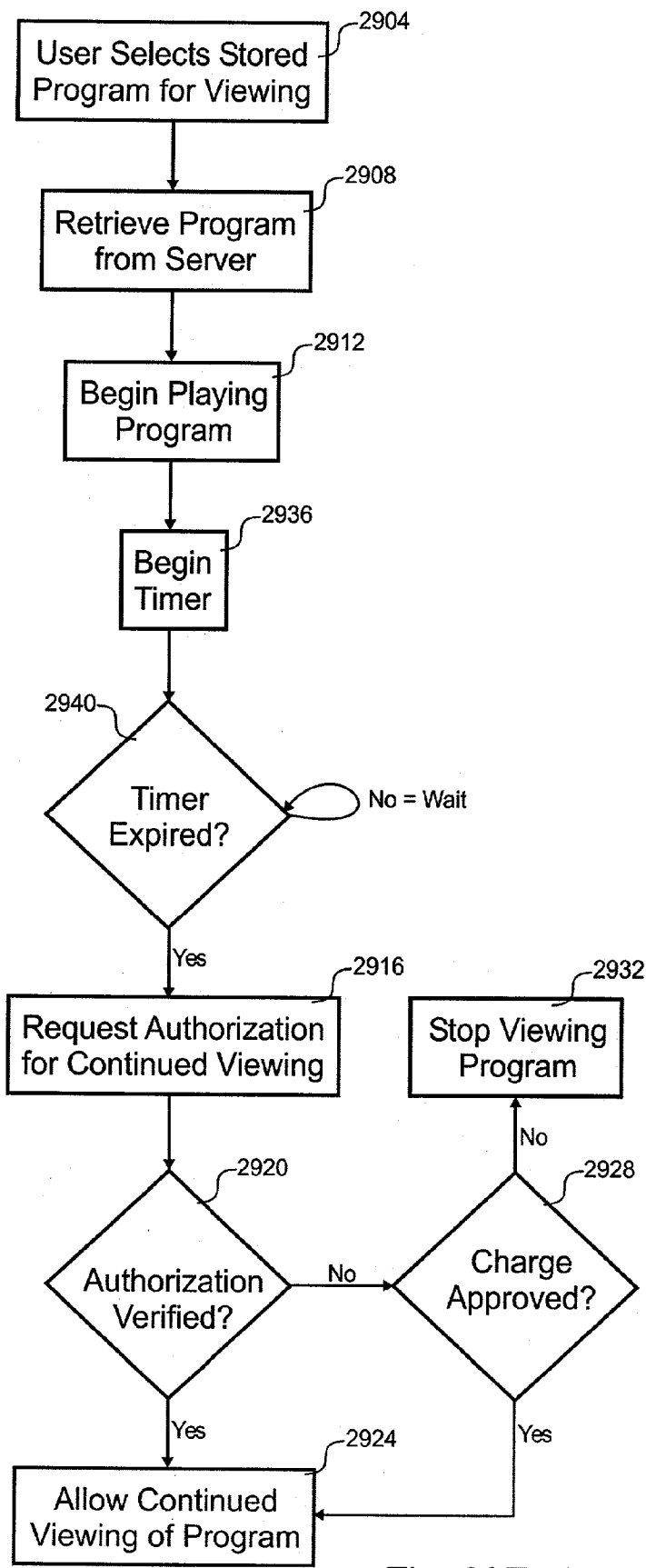
FIG. 29E is a flow diagram of yet another embodiment of a process for verifying authorized playback of a stored program that includes a preview.

With reference to FIG. 29E, a flow diagram of still another embodiment of a process for verifying authorized playback of a stored program is shown that includes a preview of the program before checking for authorization. This embodiment allows a user to preview a program for a time period before authorization is verified. In comparison to the embodiment of FIG. 29A, this embodiment adds steps 2936 and 2940 between steps 2912 and 2916. This embodiment begins playing the program in step 2912 before beginning the timer in step 2936. Step 2940 waits for the timer to expire before requesting authorization in step 2916. Some embodiments could request membership status before or during the preview period such that it is ready after the timer expires. The timer period could be set for a value in the manner described above.

A number of variations and modifications of the invention can also be used. In different embodiments, the programs sent to the users could be video or audio programs. The various embodiments described above use satellite and cable links to receive programs, however packet switched networks such as the Internet could also be used. Additionally, the control data channel could also use the Internet to communicate between the set top box and subscriber management system.

Some of the above embodiments discuss the present invention in terms of additional or premium content providers. In other embodiments the present invention could be applied to true video-on-demand services, near video on demand services, pay-per-view services, home shopping channels, commercial supported channels, or other television programming options. The user could simply pause, rewind or fast-forward any program on television to switch to a prerecorded version which the user could control playback. Alternatively, the user could go to a menu and get access to prerecorded programs for any channel.

The above embodiments store content either remotely or locally. Local storage is provided within a set top box. However, other embodiments could store locally in a number of ways. The storage device could be a video cassette recorder, a digital tape recorder, a hard drive, solid state storage, an optical drive, or other known storage mechanisms. The storage media could be removable or non-removable. The storage device could be external to the set top box and coupled thereto with a dedicated cable, wireless transceiver, and/or packet switched network.

Some of the above embodiments are discussed in the context of cable television systems, but other content providing techniques could be used. As discussed above, digital satellite broadcast could be used. Additionally, wireless, telephone or power line content distribution using digital or analog signals could also be used in addition to other broadband distribution techniques.

Although some of the embodiments discuss a set top box separate from a television display, it is to be understood other embodiments could include the set top box functionality as part of another component. For example, the set top box could be integrated into the television set.

Also, although some of the embodiments discuss the use of a remote control for activating certain functions, it is to be understood that other embodiments may include alternative methods for activating those functions. For example, voice activation, keyboards and mice may be used for such activation.

In still other embodiments, the user may be given an option to purchase a copy of a club program permanently. When such a purchase arrangement is permitted by the copyright holder, upon agreement to pay a purchase fee, the subscriber management system 124 authorizes the user to retain a permanent copy and disables the copy protection. Accordingly, the user may copy a club version of the club program onto another device, such as a PVR, VCR, or removable media, or may copy it by transmitting electronically such as by email, or otherwise. Alternatively, in embodiments where the club program is already stored at the user's set-top box 120, the subscriber management system 124 may direct the user's set-top box 120 to retain the copy of the purchased club program permanently.

In some embodiments, the promotional information 1108 could be delivered in either digital or analog form. For digital delivery, a file could be spooled with the program or separately. A DOCSIS modem or other WAN could be used, for example, to send this information. A digital channel could be dedicated to sending these digital files. With analog delivery, the clips could be sent on an analog or digital channel that is recorded. Control information would instruct the set top box 120 to start recording and stop recording and would indicate the program the promotion information 1108 is associated with. Still images, audio and/or video clips could be sent in this manner. This information could be sent during off-hours and repeatedly such that the set top box 120 could gather the promotional information 1108 for its linearly scheduled programs and VOD programs.

While the principles of the invention have been described above in connection with specific apparatuses and methods, it is to be clearly understood that this description is made only by way of example and not as limitation on the scope of the invention.

What is claimed is:

1. A method for suggesting alternative feature content for a video service in a content distribution system, the method comprising steps of:
   detecting with the content distribution system when a user stops viewing a feature program supplied by a content provider, wherein:
      the content provider is one of a plurality content providers providing feature programs viewable by the user,
      the feature program has a beginning and an end,
      the feature program includes everything between the beginning and the end, and
      the feature program optionally includes interstitial commercial programs;
   upon detecting that the user stops viewing the feature program, presenting the user with a choice of viewing first feature programs supplied by the content provider or viewing second feature programs supplied by other content providers of the plurality of content providers; and
   upon the user choosing to view the first feature programs supplied by the content provider:
      determining a plurality of alternative feature programs from the first feature programs supplied by the content provider, whereby second feature programs supplied by other content providers of the plurality of content providers are excluded from the plurality of alternative feature programs, and
   presenting in a signal the plurality of alternative feature programs for selection to the user based on the detecting step.

2. The method for suggesting alternative feature content for the video service in the content distribution system as recited in claim 1, wherein the determining step comprises a step of determining which of a plurality of users was viewing the feature program.

3. The method for suggesting alternative feature content for the video service in the content distribution system as recited in claim 1, wherein the determining step comprises steps of:
   determining a first list of alternative feature programs;
   loading preference information for the user; and
   culling down the first list based on the preference information to form the plurality of alternative feature programs.

4. The method for suggesting alternative feature content for the video service in the content distribution system as recited in claim 1, wherein the presenting step further comprises a step of organizing the alternative feature programs according to preference information of the user.

5. The method for suggesting alternative feature content for the video service in the content distribution system as recited in claim 1, wherein the detecting step comprises detection one or more of the following:
   a user stopping the feature program,
   playback of the feature program to its end,
   the user choosing to exit playback of the feature program, and detecting playback skipping ahead in the feature program to a point equal to the end of the feature program.

6. A computer-readable medium having computer-executable instructions for performing a computer-implementable method for execution on a computing device that suggests alternative feature content for the video service in the content distribution system of claim 1.

7. The method for suggesting alternative feature content for the video service in the content distribution system as recited in claim 1, wherein:
the alternative feature programs being presented in an interactive program guide that has a linear schedule of feature programs arranged in a grid, the interactive program guide including a plurality of zones separate from the grid that each have promotional data for an alternative feature program described in that zone, and
a column of the grid is selectable by the user, whereby feature programs located in the selected column and available on a plurality of channels are described in the plurality of zones.

8. The method for suggesting alternative feature content for the video service in the content distribution system as recited in claim 1, wherein:
the alternative feature programs being presented in an interactive program guide that has a linear schedule of feature programs arranged in a grid, the interactive program guide including a plurality of zones separate from the grid that each have promotional data for an alternative feature program described in that zone, and
a row of the grid is selectable by the user, the row including a plurality of feature programs supplied by the content provider on a given channel, whereby feature programs located in the selected row are described in the plurality of zones.

9. A method for suggesting alternative feature content for a video service in a content distribution system, the method comprising steps of:
detecting using the content distribution system when a user stops viewing a feature program supplied by a content provider, wherein:
the content provider is one of a plurality content providers providing feature programs viewable by the user,
the feature program has a beginning and an end,
the feature program includes everything between the beginning and the end, and
the feature program optionally includes interstitial commercial programs;
determining a plurality of feature program categories, wherein the plurality of feature program categories include first feature programs supplied by the content provider and second feature programs supplied by other content providers of the plurality of content providers; and
presenting the plurality of feature program categories for selection to the user based on the detecting step through a signal configured to be displayed on a display screen.

10. The method for suggesting alternative feature content for the video service in the content distribution system as recited in claim 9, further comprising a step of arranging the plurality of feature program categories according to a profile for the user.

11. The method for suggesting alternative feature content for the video service in the content distribution system as recited in claim 9, further comprising a step of determining, among a plurality of users, that the user is interacting with the video service.

12. A computer-readable medium having computer-executable instructions for performing a computer-implementable method for execution on a computing device that suggests alternative feature content for the video service in the content distribution system of claim 9.

13. A method for suggesting alternative feature content for a video service in a content distribution system, the method comprising steps of:
detecting with the content distribution system when a user stops viewing a feature program associated with a content provider, wherein:
the content provider is one of a plurality content providers providing feature programs viewable by the user,
the feature program has a beginning and an end,
the feature program includes everything between the beginning and the end, and
the feature program optionally includes interstitial commercial programs;
upon detecting that the user stops viewing the feature program, presenting the user with a choice of viewing first feature programs supplied by the content provider or viewing second feature programs supplied by other content providers of the plurality of content providers;
determining a plurality of alternative feature programs associated with the content provider from the first feature programs;
arranging the plurality of alternative feature programs according to preferences for the user; and
presenting the plurality of alternative feature programs for selection to the user.

14. The method for suggesting alternative feature content for the video service in the content distribution system as recited in claim 13, further comprising a step of arranging the alternative programs according to a profile for the user.

15. The method for suggesting alternative feature content for the video service in the content distribution system as recited in claim 13, further comprising a step of grouping the alternative programs by category.

16. The method for suggesting alternative feature content for the video service in the content distribution system as recited in claim 13, wherein the presenting step includes a step of presenting the alternative programs in a program guide that has a plurality of zones that each have promotional data for an alternative program described in that zone.

17. The method for suggesting alternative feature content for the video service in the content distribution system as recited in claim 13, further comprising a step of determining, among a plurality of users, that the user is interacting with the video service.

18. A computer-readable medium having computer-executable instructions for performing the computer-implementable method for execution on a computing device that suggests alternative feature content for the video service in a content distribution system of claim 13.

* * * * *